United States Patent
Ramu et al.

(10) Patent No.: US 12,460,349 B2
(45) Date of Patent: Nov. 4, 2025

(54) ADAPTIVE-LEARNING, AUTO-LABELING METHOD AND SYSTEM FOR PREDICTING AND DIAGNOSING WEB BREAKS IN PAPER MACHINE

(71) Applicant: ABB Schweiz AG, Baden (CH)

(72) Inventors: Vadthyavath Ramu, Bangalore (IN); Dinesh Patil, Bangalore (IN); Nandkishor Kubal, Pune (IN)

(73) Assignee: ABB Schweiz AG, Baden (CH)

(*) Notice: Subject to any disclaimer, the term of this patent is extended or adjusted under 35 U.S.C. 154(b) by 208 days.

(21) Appl. No.: 17/993,924

(22) Filed: Nov. 24, 2022

(65) Prior Publication Data

US 2024/0102242 A1 Mar. 28, 2024

Related U.S. Application Data

(63) Continuation of application No. PCT/IB2021/053173, filed on Apr. 16, 2021.

(30) Foreign Application Priority Data

May 26, 2020 (IN) .............................. 202041021959

(51) Int. Cl.
*D21F 7/04* (2006.01)
*D21G 9/00* (2006.01)
(Continued)

(52) U.S. Cl.
CPC ............. *D21F 7/04* (2013.01); *D21G 9/0054* (2013.01); *G06F 30/27* (2020.01); *G06V 30/194* (2022.01)

(58) Field of Classification Search
CPC .... D21G 9/0054; D21G 9/0009; G06F 30/27; G06F 18/2148; G06F 18/2185; G06V 30/194; D21F 7/04
See application file for complete search history.

(56) References Cited

U.S. PATENT DOCUMENTS

| 5,942,689 A | 8/1999 | Bonissone et al. |
| 6,405,140 B1 | 6/2002 | Chen et al. |

(Continued)

FOREIGN PATENT DOCUMENTS

| CN | 109034209 | 12/2018 |
| CN | 110008079 | 7/2019 |

(Continued)

OTHER PUBLICATIONS

Yang et al., "Learning to Predict Train Wheel Failures," *Proceedings of the 11th ACM SIGKDD International Conference on Knowledge Discovery and Data Mining (KDD)*, 10 pp. (Aug. 21-24, 2005).

(Continued)

*Primary Examiner* — Abbas Rashid
*Assistant Examiner* — Elisa H Vera
(74) *Attorney, Agent, or Firm* — Leydig, Voit & Mayer, Ltd.

(57) ABSTRACT

A system and method for labelling normal and abnormal regions in data related to a paper machine for web break prediction and labelling individual parameters for root cause analysis, using machine learning models, includes using the machine learning models in real-time to predict breaks in the paper web, analyzing root cause for the breaks in the paper web, and estimating a time to break. An auto-data-labeling framework helps in adaptive learning for autonomous model improvement of the deployed model, transfer learning, shortlisting parameters and automating feasibility study.

17 Claims, 29 Drawing Sheets

(51) Int. Cl.
  *G06F 30/27*   (2020.01)
  *G06V 30/194*  (2022.01)

(56) References Cited

U.S. PATENT DOCUMENTS

| 6,466,877 | B1  |   | 10/2002 | Chen et al. |             |
|-----------|-----|---|---------|-------------|-------------|
| 2016/0364522 | A1 | * | 12/2016 | Frey ........................ | G16B 40/20 |
| 2019/0043619 | A1 | * | 2/2019  | Vaughan ................. | G16H 20/70 |
| 2024/0103456 | A1 | * | 3/2024  | Joensuu ............. | G05B 13/0265 |

FOREIGN PATENT DOCUMENTS

| CN | 110991476 A  | 4/2020  |
| JP | 2005-299028 A | 10/2005 |
| SG | 124114 A1    | 8/2006  |

OTHER PUBLICATIONS

European Patent Office, International Search Report in International Patent Application No. PCT/IB2021/053173, 6 pp. (Dec. 2, 2021).
European Patent Office, Written Opinion in International Patent Application No. PCT/ IB2021/053173, 10 pp. (Dec. 2, 2021).
The Patent Office of the People's Republic of China, Office Action in Chinese Patent Application No. 202180036418.6, 12 pp. (Mar. 22, 2025).

* cited by examiner

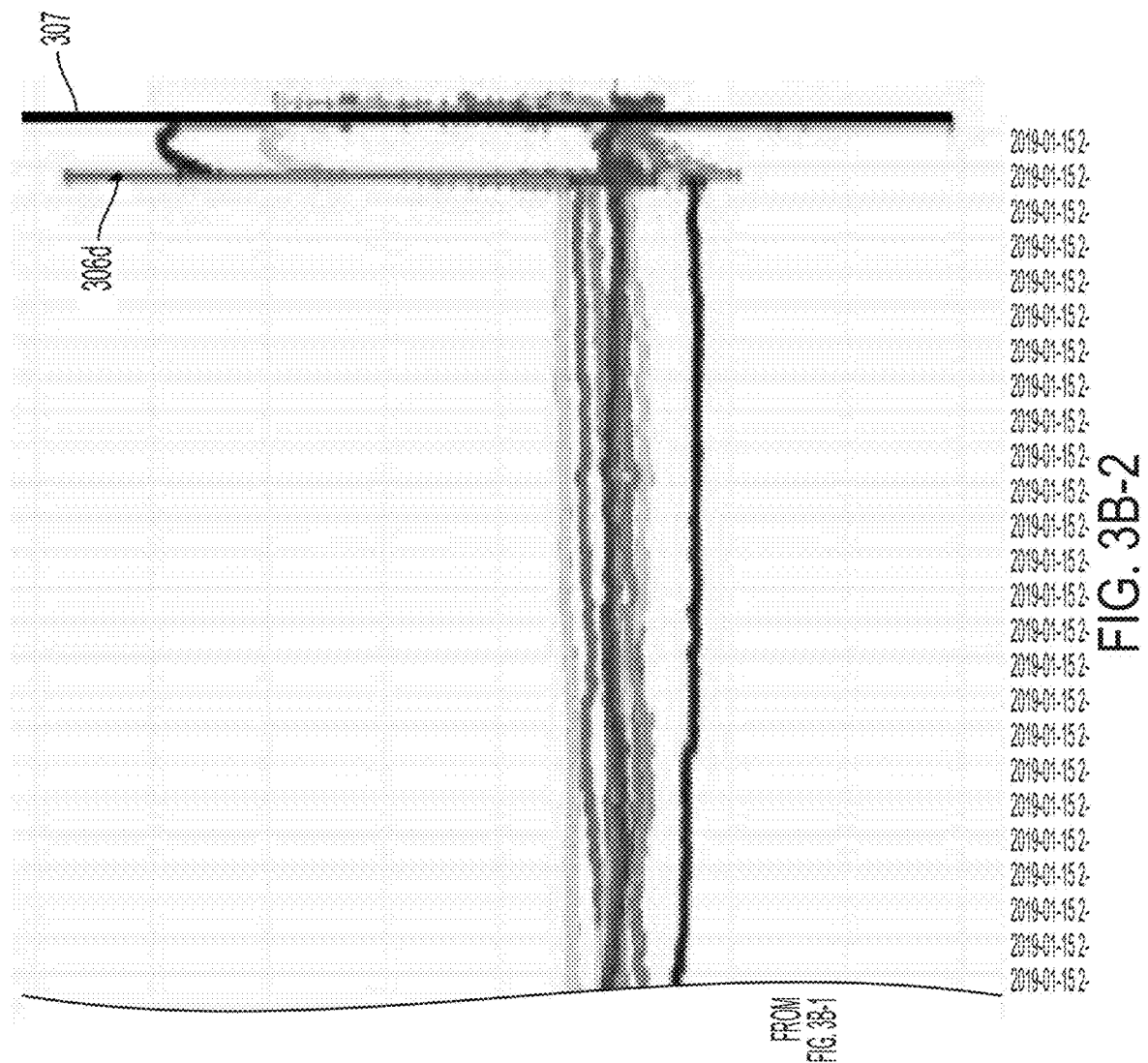

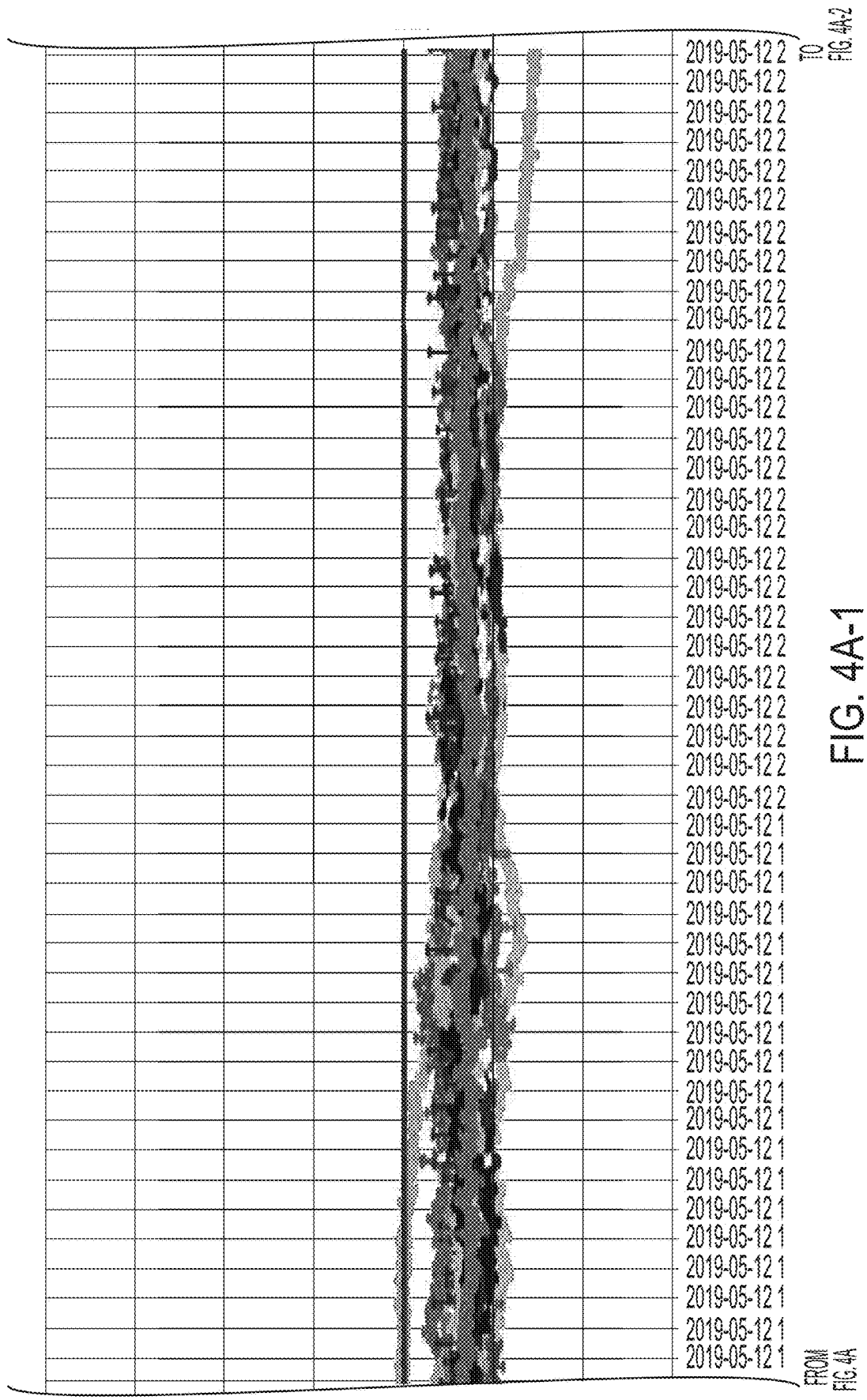

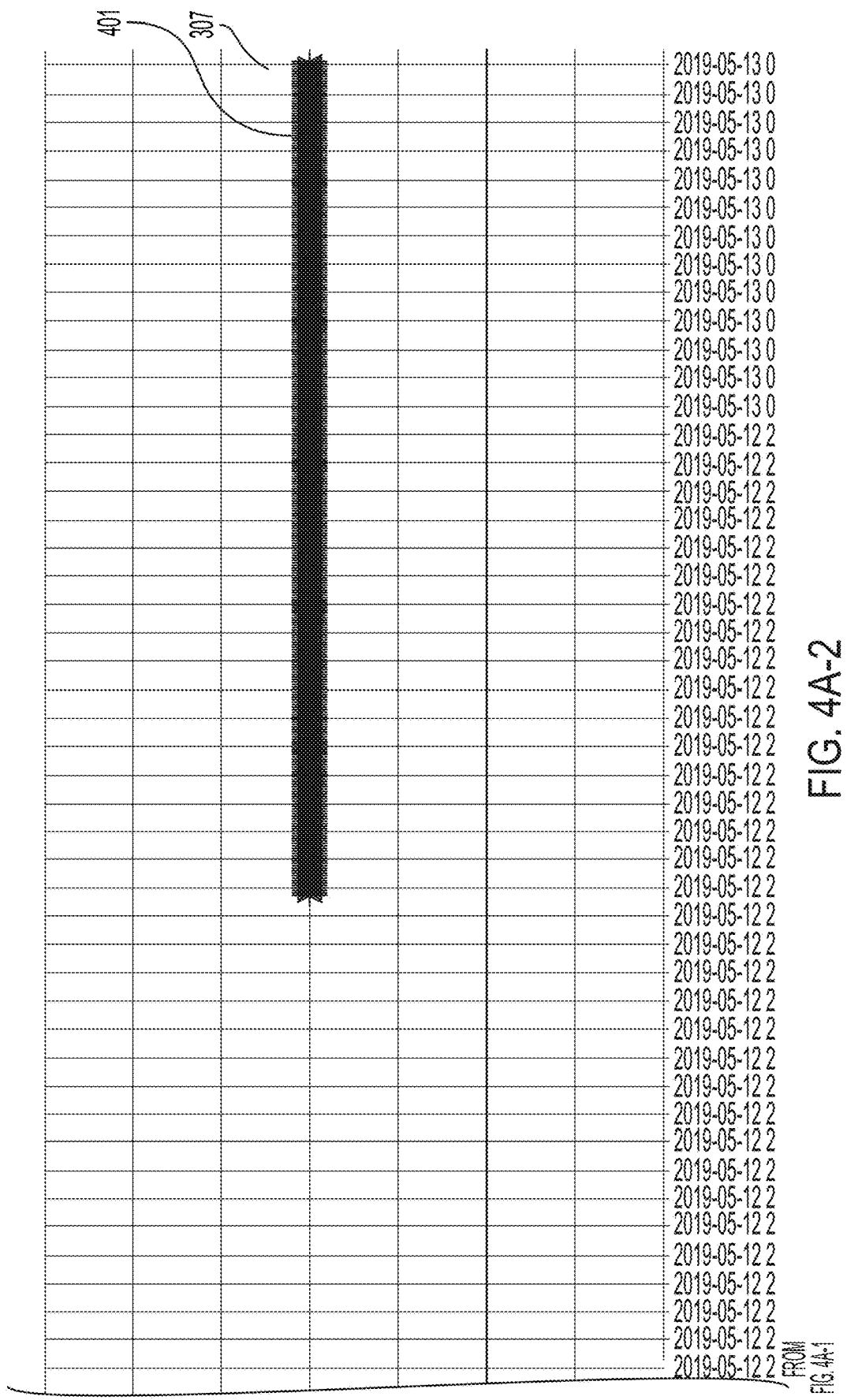

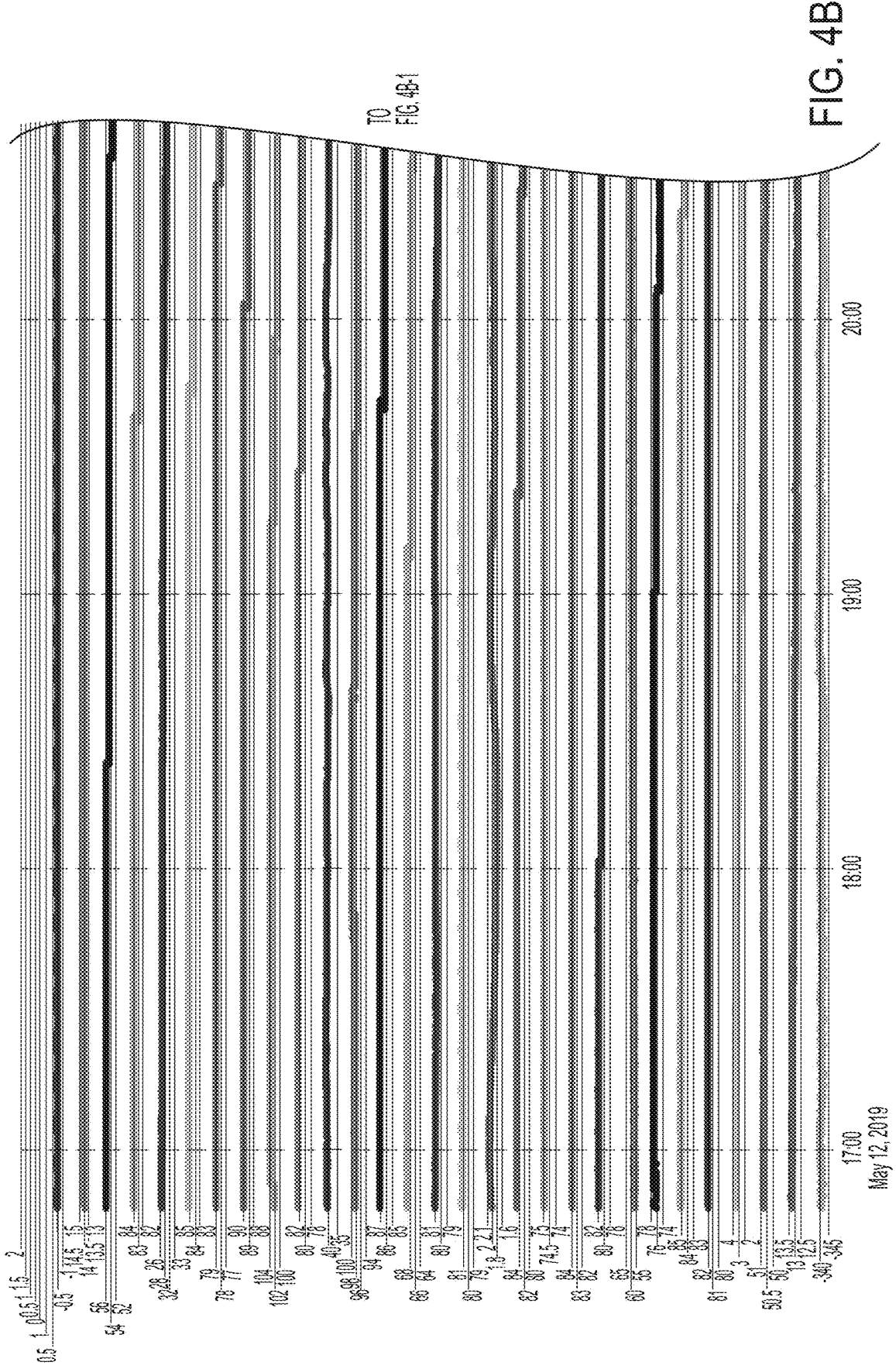

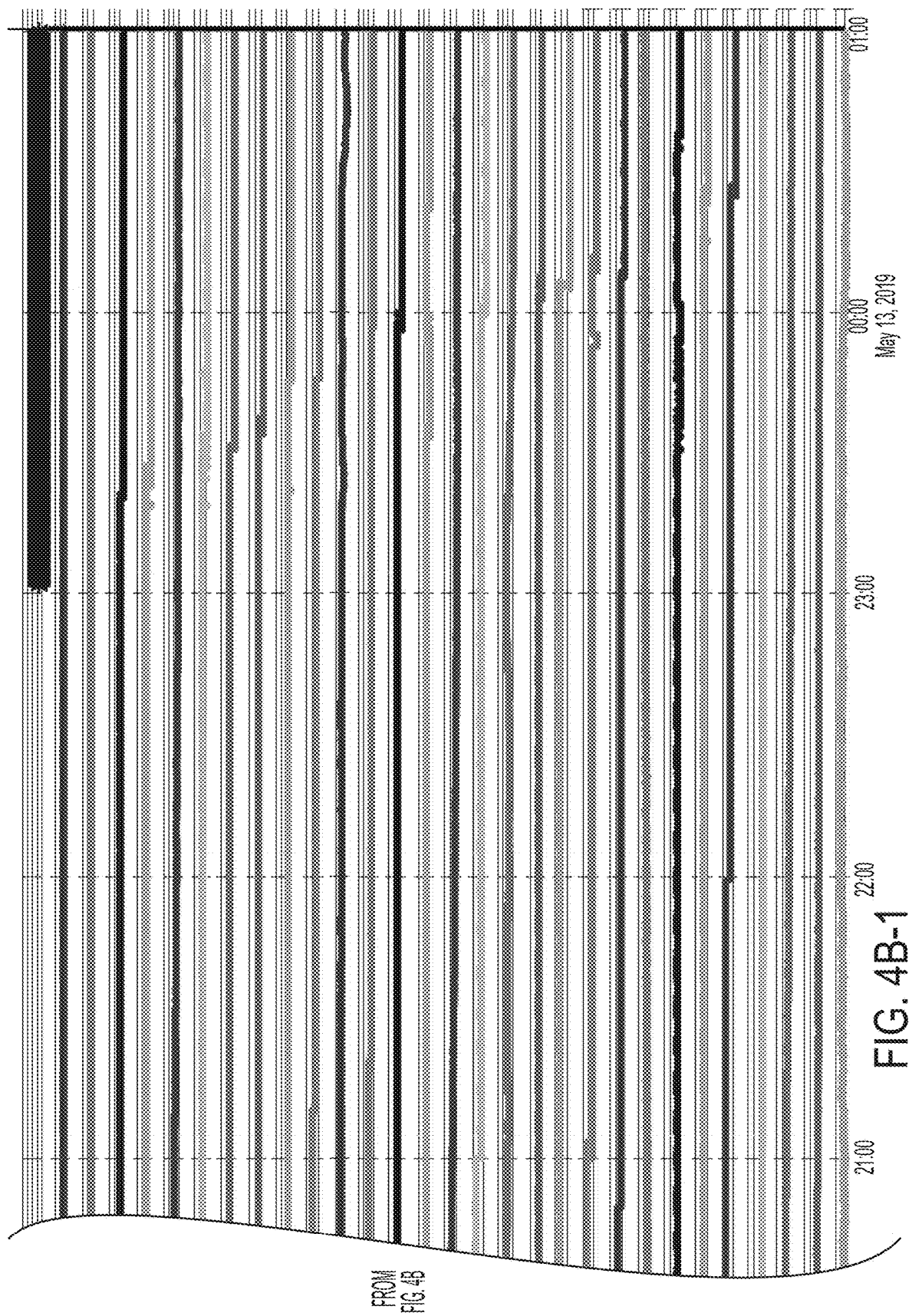

ADAPTIVE-LEARNING, AUTO-LABELING METHOD AND SYSTEM FOR PREDICTING AND DIAGNOSING WEB BREAKS IN PAPER MACHINE

CROSS-REFERENCE TO RELATED APPLICATIONS

This patent application claims priority to International Patent Application No. PCT/IB2021/053173, filed on Apr. 16, 2021, which claims priority to Indian Patent Application No. 202041021959, filed on May 26, 2020, each of which is incorporated herein in its entirety by reference.

FIELD OF THE DISCLOSURE

The present disclosure relates to a framework for predicting faults in an apparatus and, more specifically, to labelling, predicting and diagnosing breaks in paper webs in a paper machine.

BACKGROUND OF THE INVENTION

Paper is consumed in multiple forms in our everyday activities like packaging paper, writing paper, printing paper, paperboard, cardboard, tissue paper, books, magazines, documents, newspaper etc. In recent times, paper has gained momentum in the packaging sector for both industrial and consumer products. Paper making process involves a paper machine, which is an industrial machine that converts pulp into paper in large quantities at high speed. Pulp parameters or properties are different for different grades (for example paper basis weight for tissue paper is different from board paper or writing paper). Pulp is input to the paper machine and the pulp is mixed with water in the paper machine. The paper machine creates different grades of paper depending on application using the relevant pulp.

The paper machine involves multiple sections in the paper making process. These sections include a head box, a forming section, a press section, a dryer section, a calendar section, and a reeling section. A modern paper machine operates at 5000 ft/min. In a paper machine, there are frequent failures which are called web breaks (breaks in a paper web) leading production downtime. Hence, predicting the web breaks and expected time to breaks in the paper web with probable root causes will assist the operator in avoiding the breaks at that instance or to avoid in future.

Various solutions have been proposed to predict web breaks, analyze root cause of web breaks. Few techniques use neural networks to predict web breaks and decision trees to analyze root cause. Existing technologies have limitation in labelling data required to predict the web breaks and analyze the root causes. In the existing techniques, the data is labelled manually, which is cumbersome and infeasible as number of parameters in the paper plant increases. Further, unsupervised models are used with un-labelled data to predict web breaks, which fails to result in robust predictions. Hence, there is a need to label the data in an efficient way to reduce manual efforts as well as accurately detect transitions leading to the web breaks.

BRIEF SUMMARY OF THE INVENTION

In one aspect, the present disclosure relates to a method of labelling parameters related to a paper machine to predict a break in paper web caused by the paper machine. The parameters comprise a plurality of process parameters and a plurality of operational parameters. In an embodiment, the parameters are not limited to process and operational parameters alone, but the present invention can work with any signal measured in the paper plant. In an embodiment, simulated parameters related to the paper machine, comprising normal patterns, and abnormal patterns which has caused a break in the paper web are provided to a plurality of machine learning models. The simulation parameters may be generated using known techniques.

In an embodiment, the simulation parameters are generated using historical parameters of the paper plant. Further, the plurality of machine learning models is configured to label the simulated parameters into normal patterns and abnormal patterns. In an embodiment, the abnormal patterns are proximate to a timestamp of the break in the paper web. Further, an output from each of the plurality of machine learning models is received, where the output is indicative of labels comprising the normal patterns and the abnormal patterns. Furthermore, a model from the plurality of machine learning models is selected based on one or more performance metrics and the output of the plurality of machine learning models and storing one or more model parameters of the selected model in a memory of the computing unit. Thereafter, an auto-labeller is provided with historical parameters related to the paper machine, comprising at least one of the normal patterns and the abnormal patterns, and the plurality of details of the selected model, to label the historical parameters into the normal patterns and the abnormal patterns. The labels generated by the auto-labeller are stored as labelled data in a database, where the labelled data is used for predicting a break in the paper web in real-time and root causes for the break in the paper web.

BRIEF DESCRIPTION OF THE SEVERAL VIEWS OF THE DRAWING(S)

Figure 1:
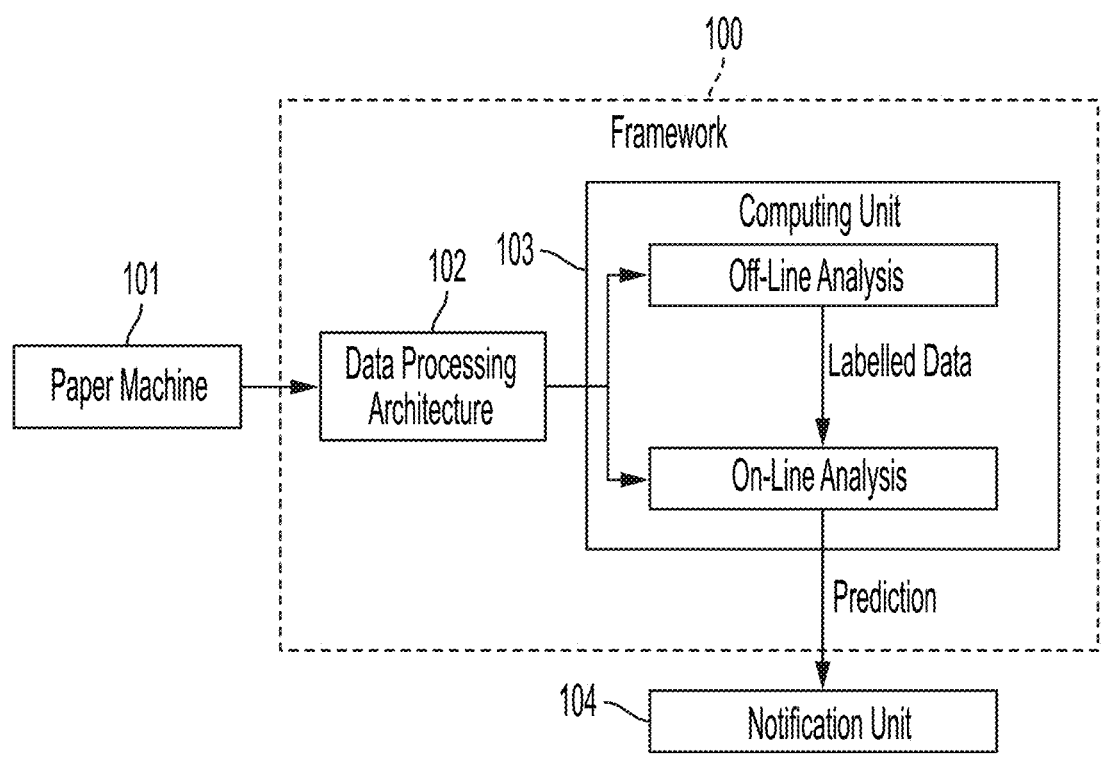
FIG. 1 is a block diagram for a framework for labelling and predicting breaks in a paper web in a paper machine, in accordance with some embodiments of the present disclosure.
Figure 2:
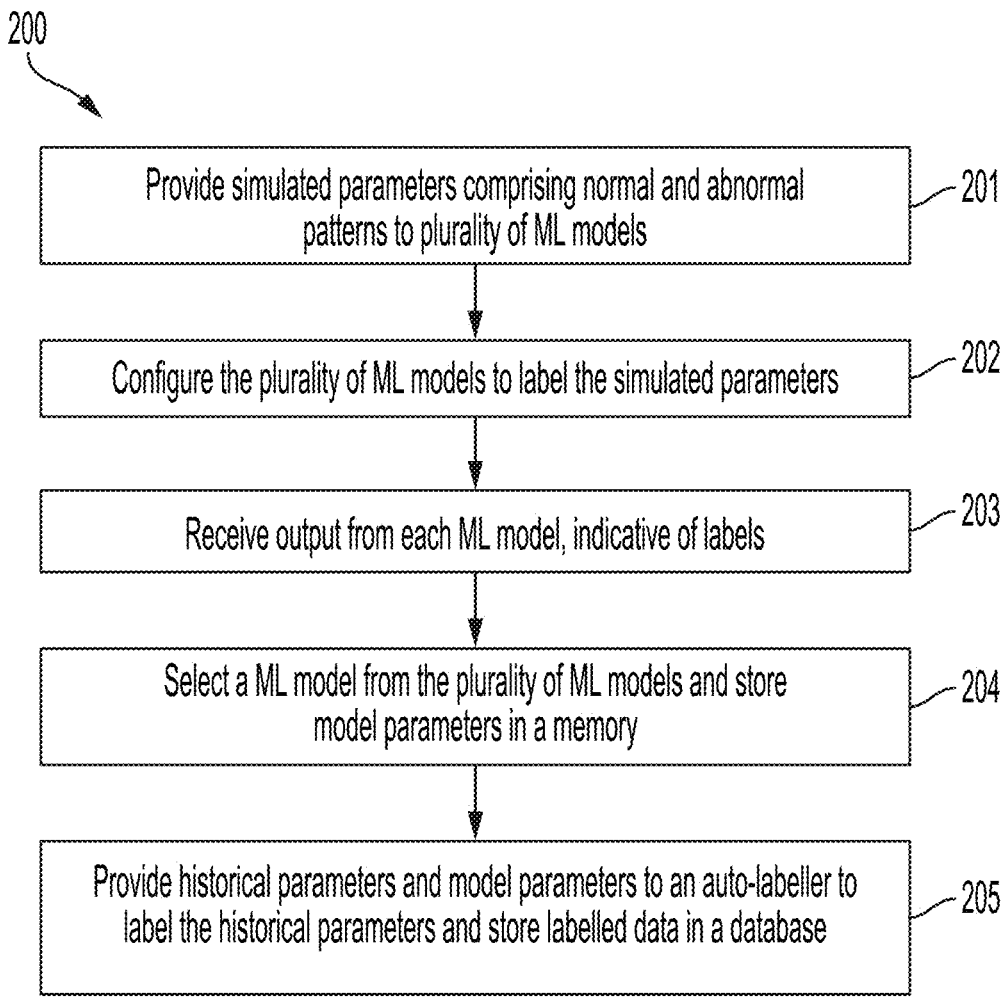
FIG. 2 is a flowchart for an exemplary method for labelling parameters related to a paper machine, in accordance with some embodiments of the present disclosure.
Figure 3A:
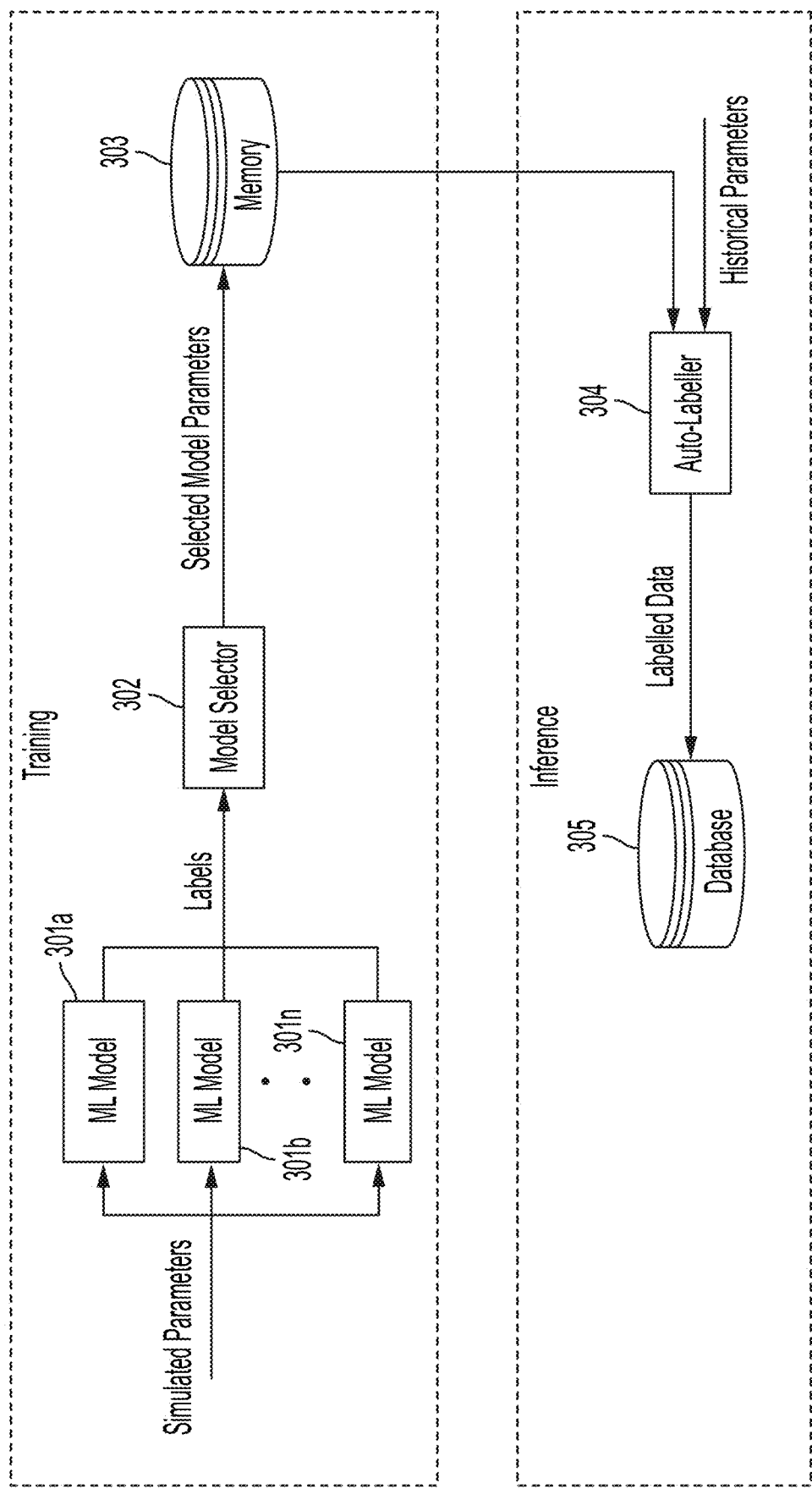
FIG. 3A is a block diagram of a system for training and inference stages of machine learning models for labelling parameters related to a paper machine, in accordance with some embodiments of the present disclosure.
Figure 3B:
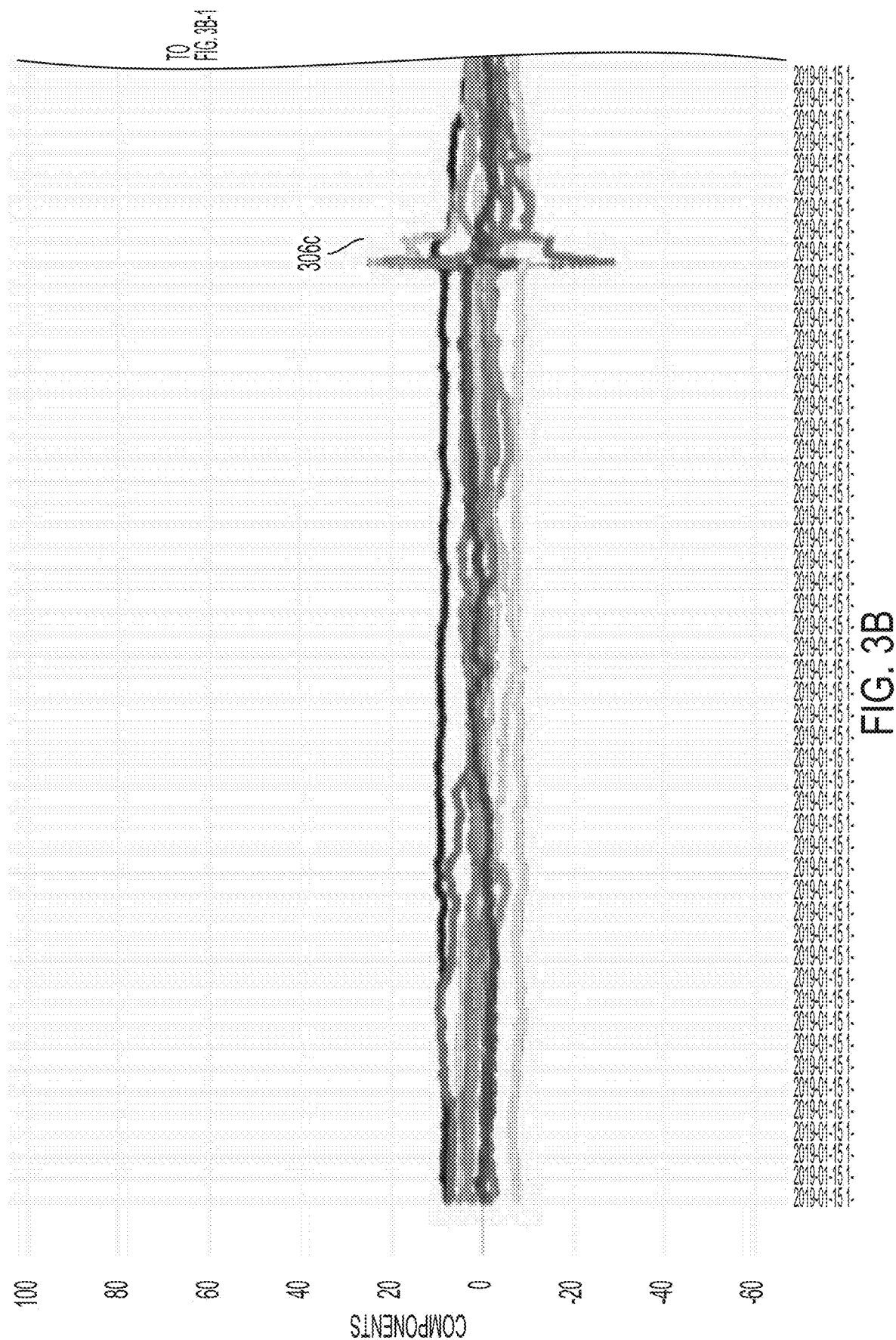
Figures 1, 3B:
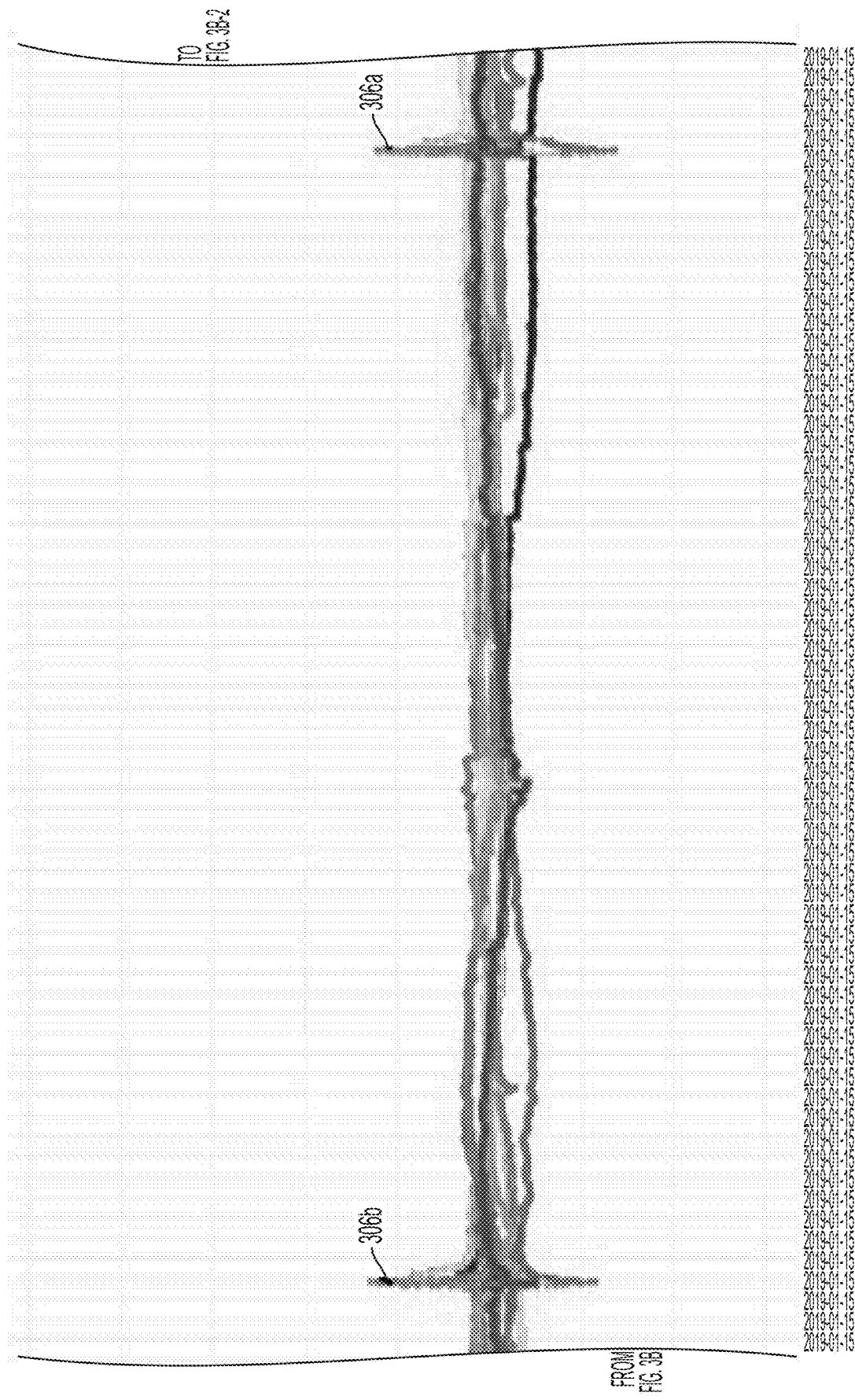

FIGS. 3B, 3B-1, and 3B-2 illustrate portions of an exemplary graph of simulated parameters, in accordance with some embodiments of the present disclosure.

Figure 3C:
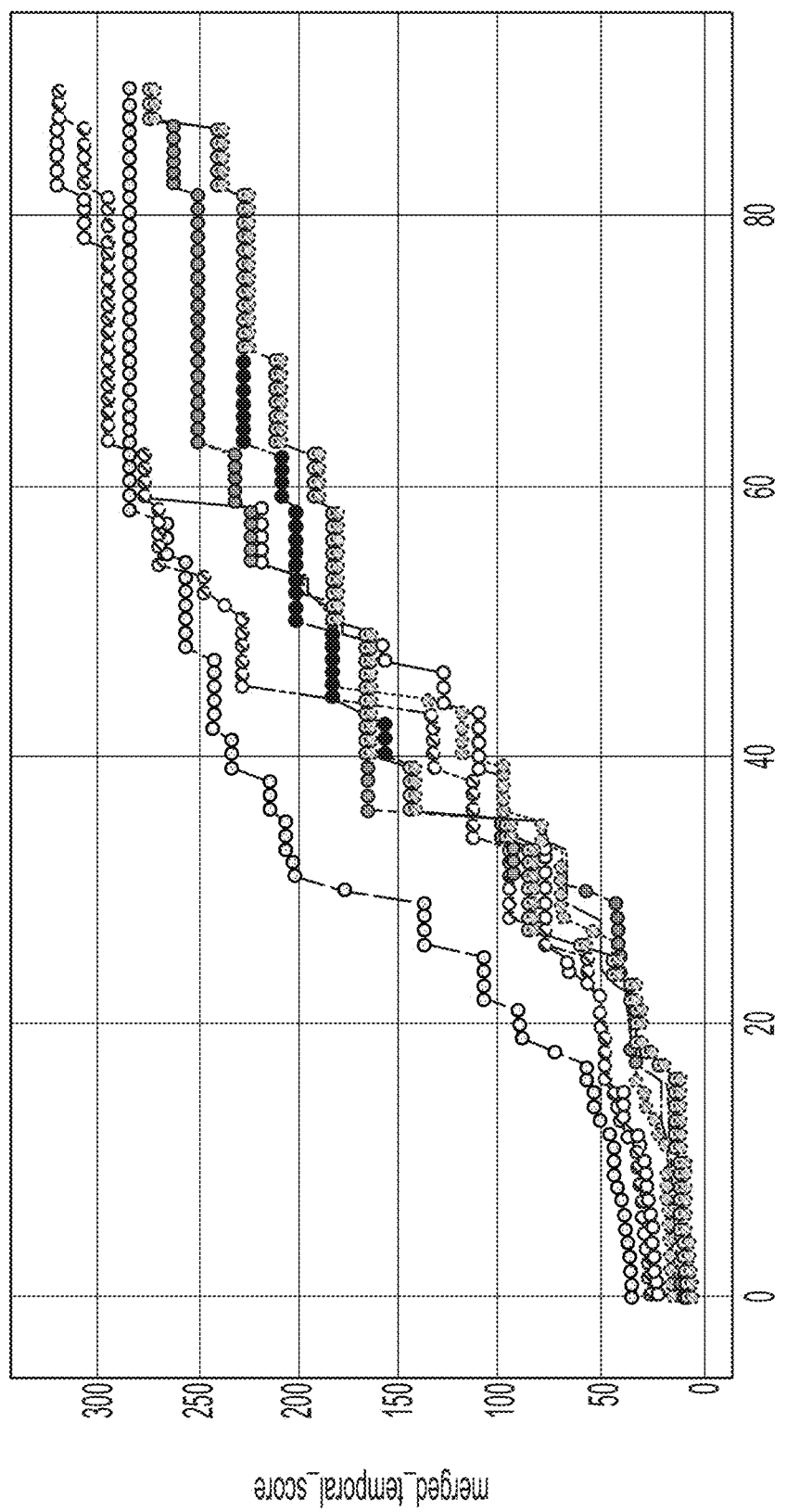

FIG. 3C illustrates a graph of merging score for different time values by different ML models, in accordance with some embodiments of the present disclosure.

FIGS. 4A, 4A-1, and 4A-2, and FIGS. 4B, and 4B-1 illustrate portions of exemplary graphs showing label indicative of abnormal patterns in parameters related to a paper machine, in accordance with some embodiments of the present disclosure.

Figure 5:
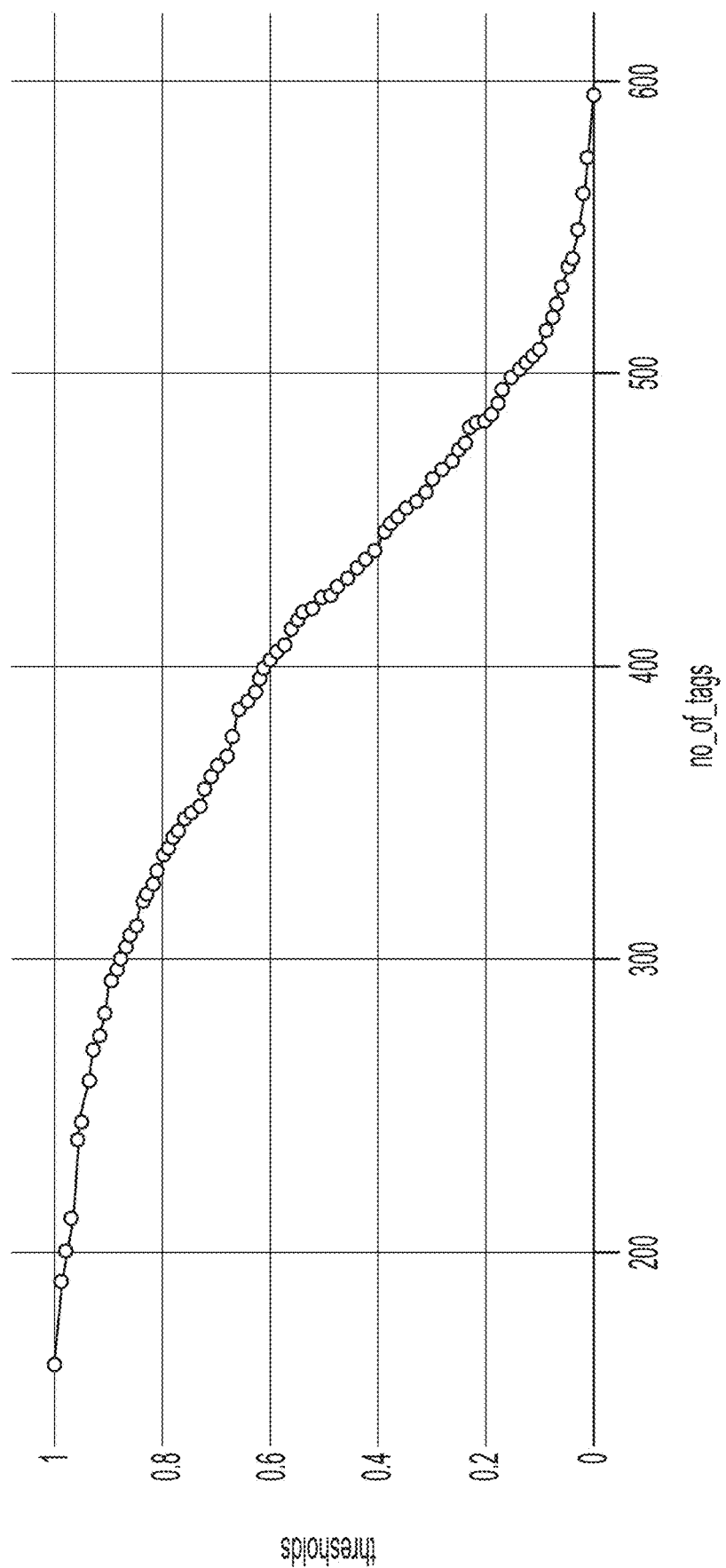

FIG. 5 illustrates and exemplary graph for selecting parameters contributing to the breaks in the paper web, in accordance with some embodiments of the present disclosure.

FIGS. 6A, 6A-1, 6A-2, and 6A-3, and FIGS. 6B, 6B-1, and 6B-2 illustrate portions of exemplary graphs showing labels indicative of abnormal patterns in reduced parameters related to a paper machine, in accordance with some embodiments of the present disclosure.

Figure 7A:
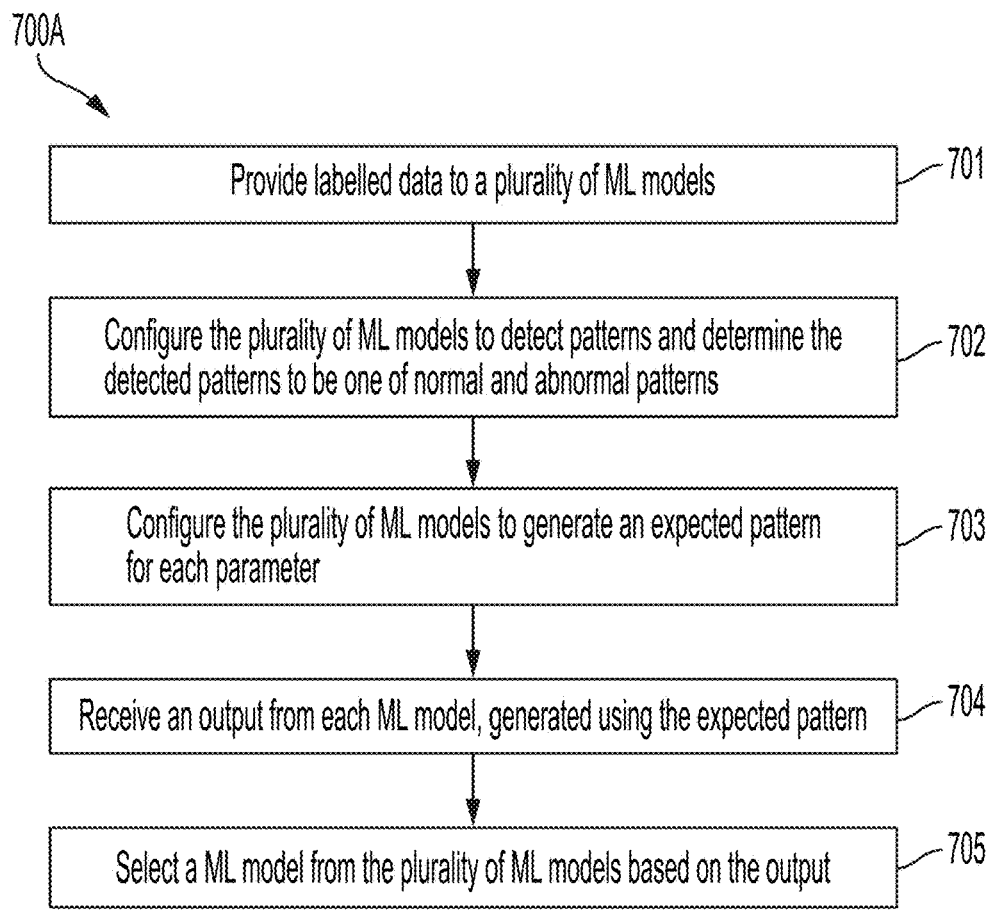
Figure 7B:
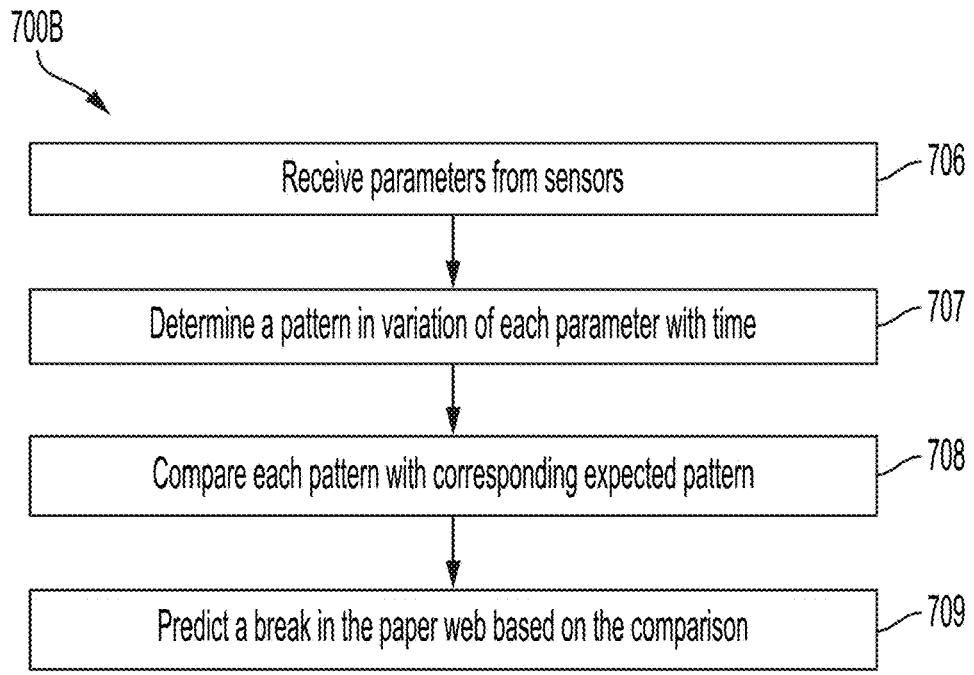

FIG. 7A and FIG. 7B illustrate flowcharts for methods for training and inferencing break prediction in paper web, in accordance with some embodiments of the present disclosure.

Figure 8A:
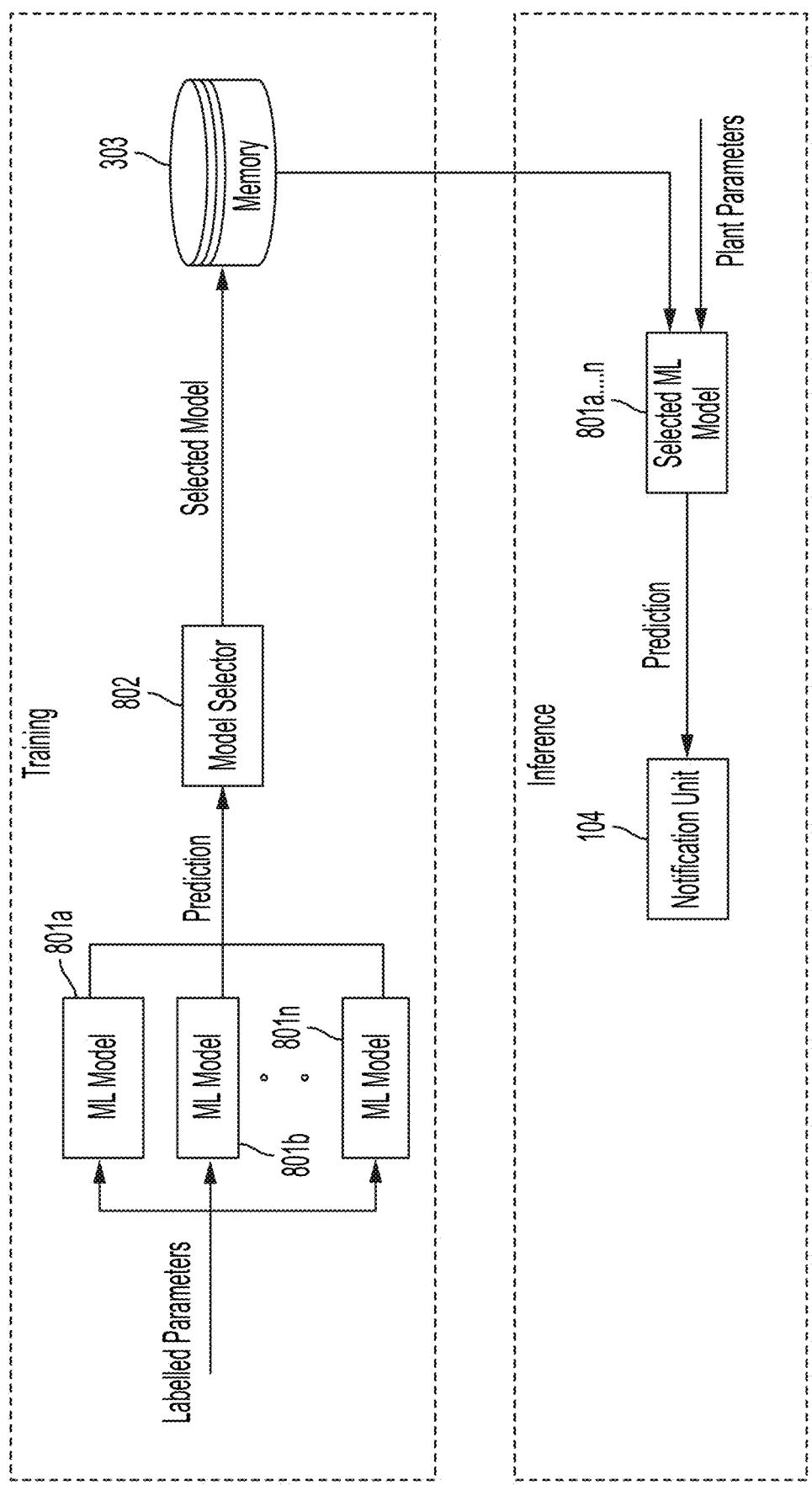

FIG. 8A is a block diagram for a system for training and inference stages of machine learning models for predicting, a break in a paper web, a root cause of the break and estimated time to break, in accordance with some embodiments of the present disclosure.

Figure 8B:

FIG. 8B illustrates an exemplary block diagram for adaptive learning of a selected ML model, in accordance with some embodiments of the present disclosure.

Figure 9:
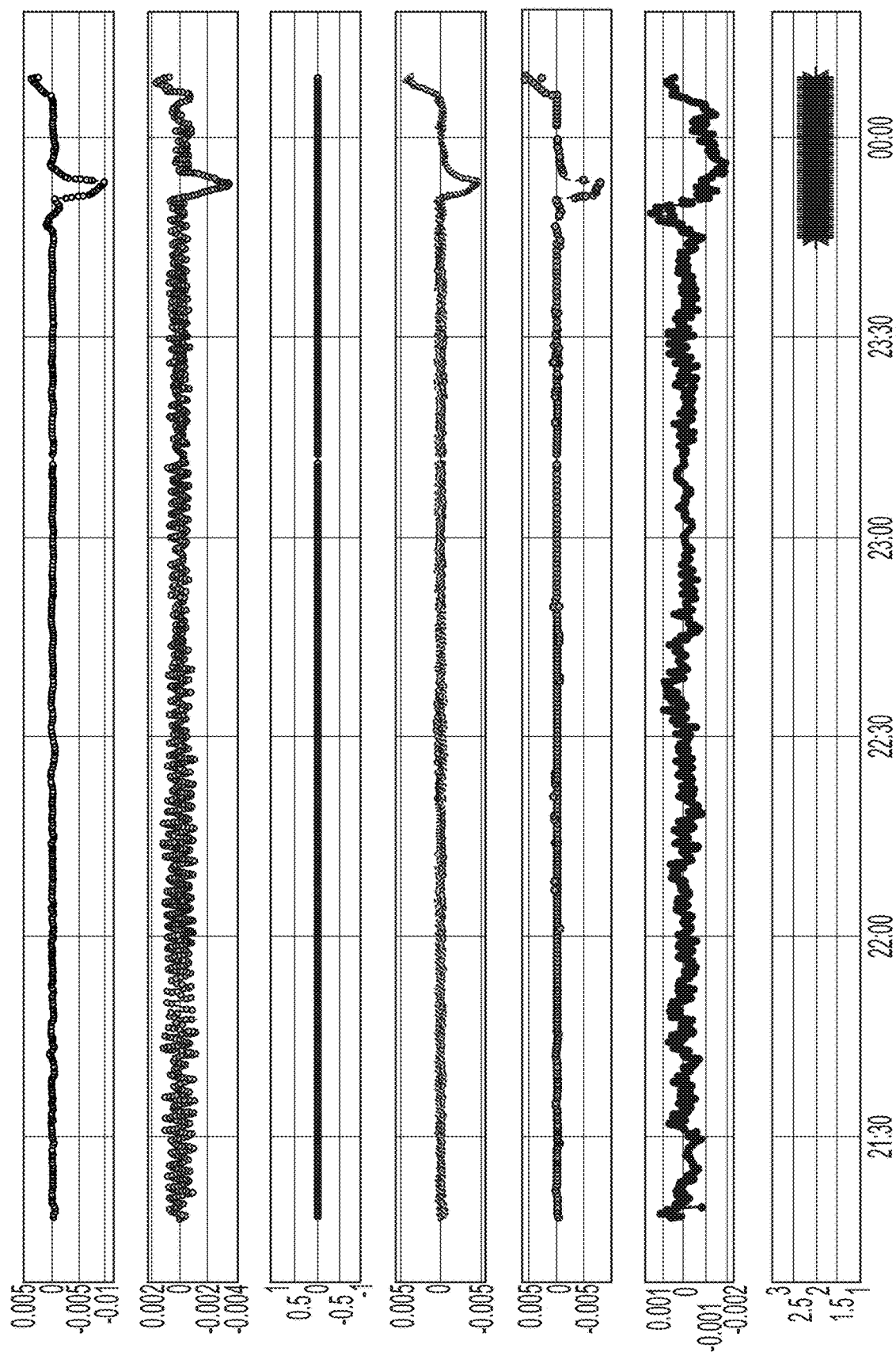

FIG. 9 illustrates an exemplary graph showing predictions of abnormal patterns using semi-supervised techniques technique, in accordance with some embodiments of the present disclosure.

Figure 10:
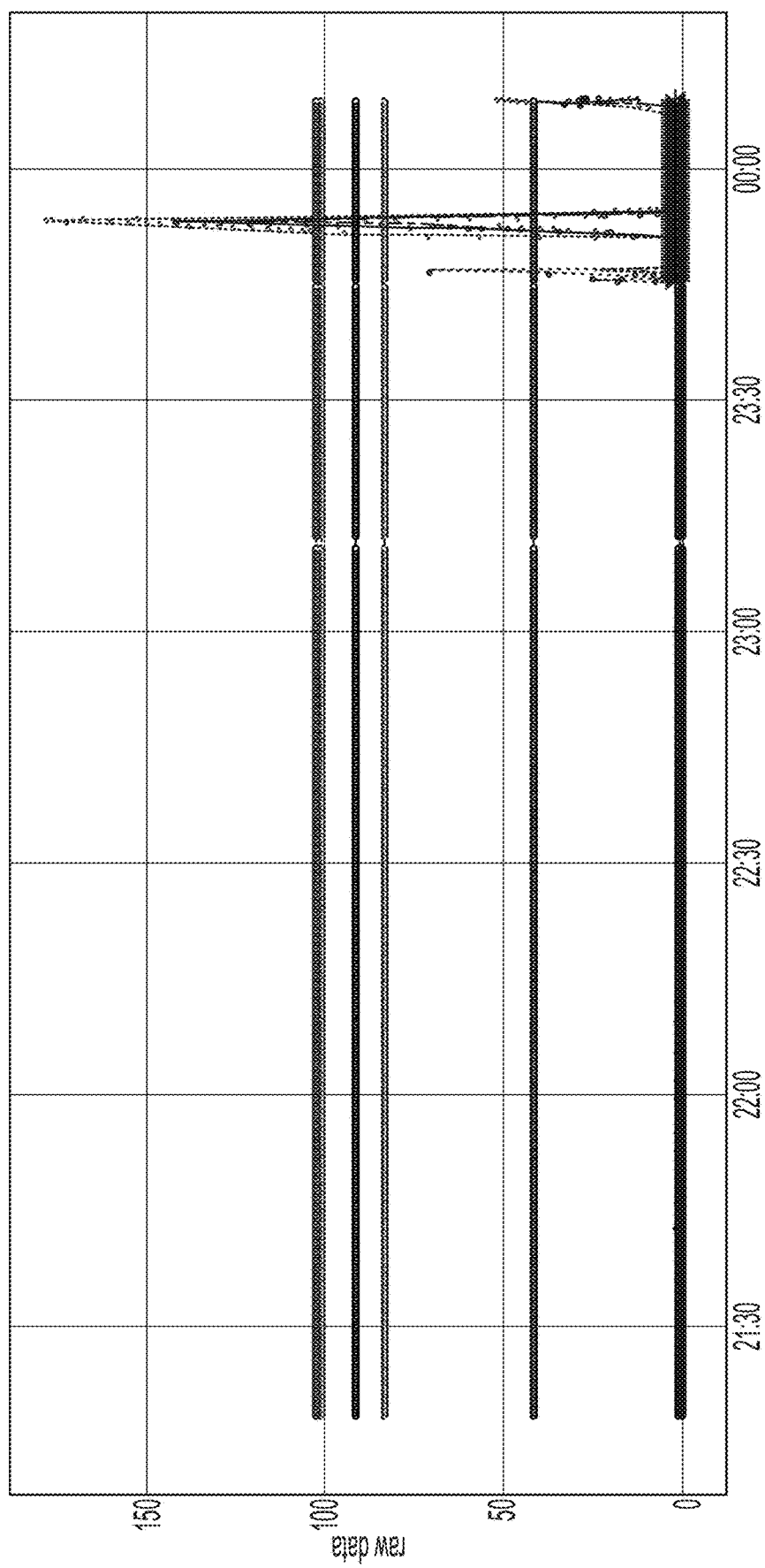

FIG. 10 is an illustration of reconstruction error in the predictions of breaks in paper web of a paper machine using semi-supervised techniques, in accordance with some embodiments of the present disclosure.

Figure 11:
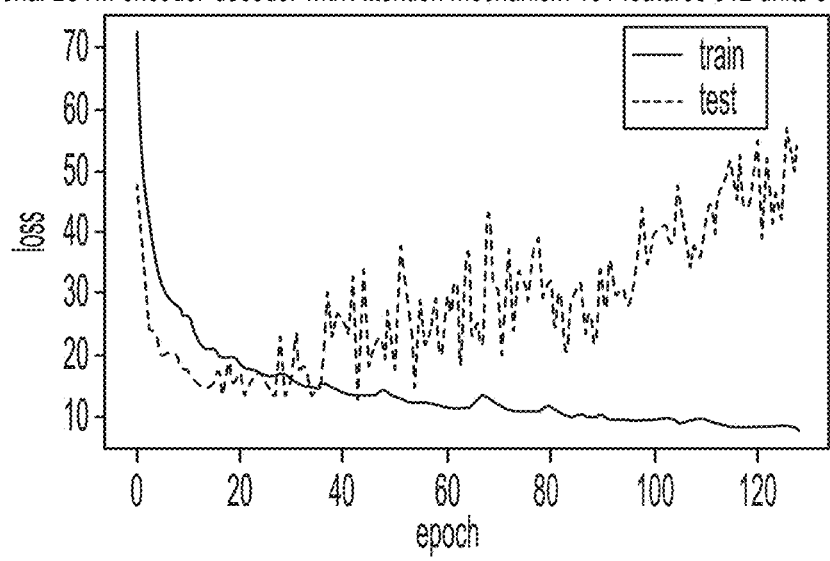

FIG. 11 illustrates an exemplary graph of learning of the machine learning models, in accordance with some embodiments of the present disclosure.

Figure 12A:
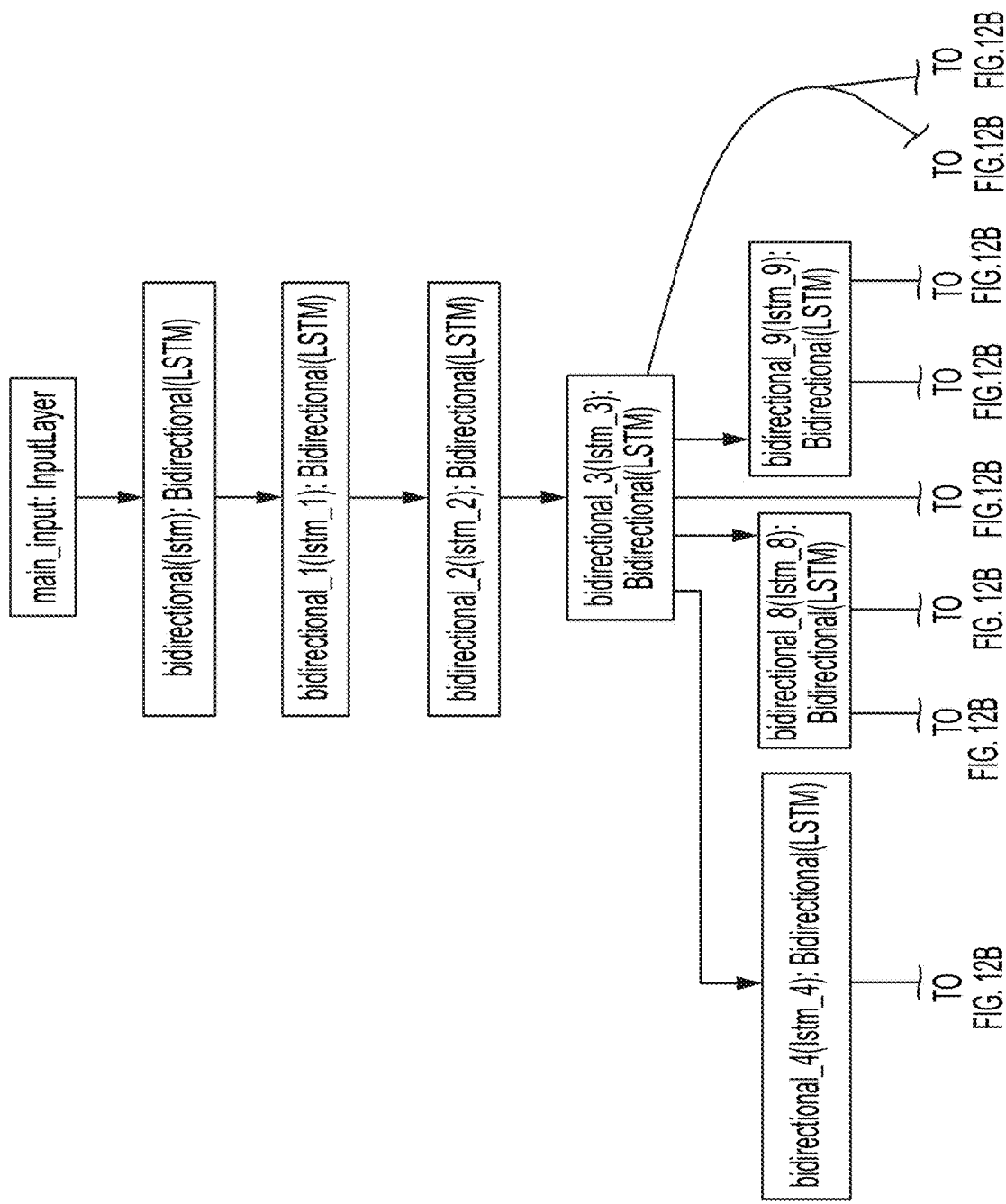
Figure 12B:
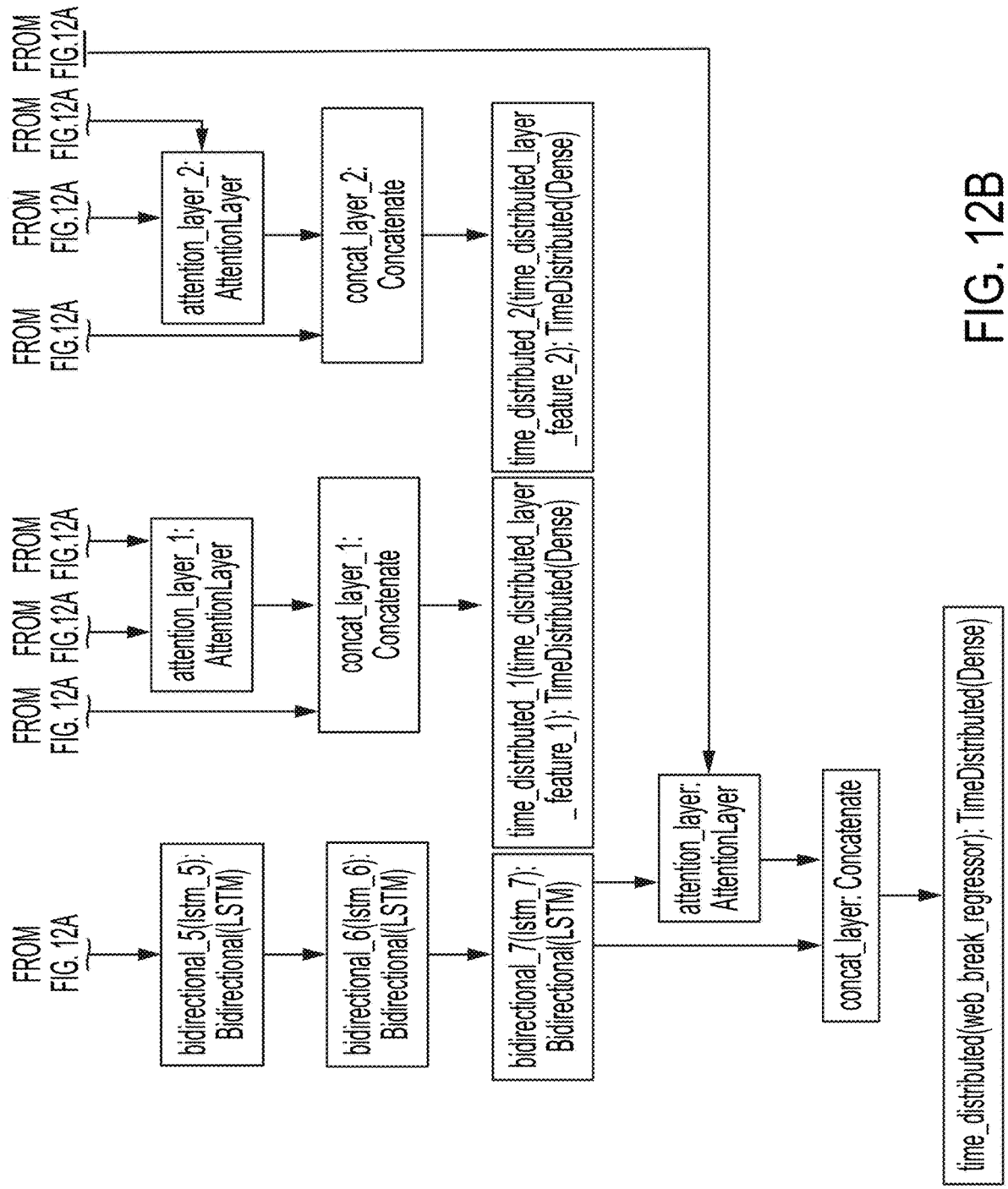

FIGS. 12A and 12B illustrates a network diagram for generating the training and testing outcomes as shown FIG. 11, in accordance with some embodiments of the present disclosure.

Figure 13:
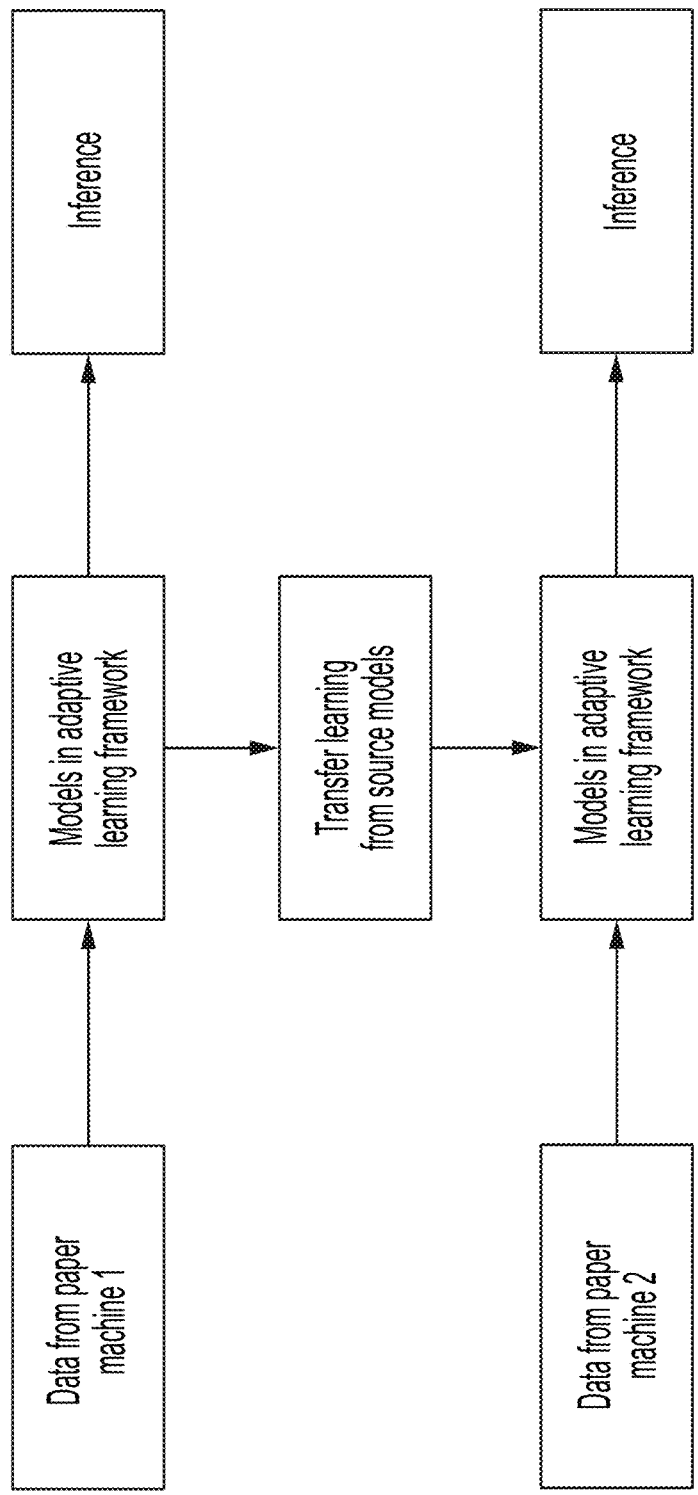

FIG. 13 illustrates an exemplary block diagram for transferring knowledge from one ML model to another ML model associated, in accordance with some embodiments of the present disclosure.

DETAILED DESCRIPTION OF THE INVENTION

By way of introduction, various embodiments are discussed first. In an embodiment, simulated parameters and historical parameters are received in a plurality of batches. Each batch comprises the plurality of process parameters and the plurality of operating parameters simulated or measured between a time of restarting the paper machine after a break in the paper web, to a time of a subsequent break of the paper web in the paper machine.

The simulated parameters and the historical parameters having the abnormal patterns are labelled with a root cause for the break in the paper web, where the root cause for the break in the paper web is included in the labelled data. Additionally, simulated parameters and historical parameters having the abnormal patterns are labelled with an estimated time to break the paper web, where the estimated time to break the paper web is included in the labelled data.

Each batch is labelled to comprise the normal patterns and the abnormal patterns based on one of, independently analyzing each batch or by providing similar batches to the auto-labeller.

In an embodiment, the present disclosure relates to training a plurality of machine learning models to predict a break in a paper web. Training the plurality of machine learning models comprises providing labelled data comprising normal patterns and abnormal patterns of parameters related to a paper machine, to the plurality of machine learning models. In an embodiment, a timestamp is associated with the abnormal value, and the timestamp of the abnormal values is proximate to a timestamp of the break in the paper web. The labelled data is generated using an auto-labeller using simulated parameters and historical parameters related to the paper machine. Further, the plurality of machine learning models is configured to detect patterns in the parameters and determine the detected patterns into at least one of normal patterns and abnormal patterns. Furthermore, the plurality of machine learning models is configured to generate an expected pattern for each parameter based on the determination, where each expected pattern comprises at least one of, normal patterns and abnormal patterns. Furthermore, an output from each of the plurality of machine learning models is received, where the output is indicative of a prediction of the break in the paper web based on a comparison of the labelled data with corresponding expected patterns. Thereafter, a machine learning model is selected from the plurality of machine learning models based on the output of the plurality machine learning models.

In an embodiment, the present disclosure relates to a method of predicting a break in a paper web in a paper machine. A plurality of sensors is used to monitor parameters related to the paper machine, where the parameters comprise a plurality of process parameters and a plurality of operating parameters. During manufacturing of paper, a paper web is provided/formed in the paper machine. The method comprises receiving the parameters from the plurality of sensors. Further, a pattern in a variation of each parameter, with time is determined. Furthermore, each of the determined pattern Is compared with corresponding expected pattern. Thereafter, a break in the paper web is predicted based on the comparison.

In an embodiment, the plurality of models is further trained to estimate a time to break the paper web and determine a root cause that causes a break in the paper web based on abnormal patterns in the parameters and the labelled data. Also, the plurality of models is further trained to generate an association between the abnormal patterns and the estimation of time to break of the paper web, and an association between the abnormal patterns and the root cause for the break in the paper web.

In an embodiment, the selected model identifies the abnormal patterns in the parameters received from the one or more sensors based on the comparison of each of the determined pattern with corresponding expected pattern. Further, the selected model determines a root cause for the break in the paper web and an estimate of time to break in the paper web based on an association between the abnormal patterns and the root cause for the break in the paper web and an association between the abnormal patterns and the estimation of time to break of the paper web.

In an embodiment, the parameters are received after each break in the paper web. Further, the parameters are provided to an auto-labeller for generating labels comprising the normal patterns and abnormal patterns. Furthermore, the generated labels are stored as labelled data in a database.

In an embodiment, the labelled data stored in the database are provided to the machine learning model as a feedback at defined intervals of time. Further, one or more features are identified from the labelled data that caused the break in the paper web. Thereafter, the machine learning model is trained to adapt to the one or more features and configure the machine learning model to predict the break in the paper web based on the one or more features.

In an embodiment, prescriptive analysis is performed on the plurality of process parameters and the plurality of operating parameters and the at least one parameter identified as the root cause for the break in the paper web, to determine one or more actions to be performed to restore operation of the paper machine.

In an embodiment, one or more model parameters of the machine learning model to a new machine learning model for predicting a break in a paper web, determining a root cause for break in the paper web, and estimating a time to break of the paper web in a new paper machine.

Systems of varying scope are described herein. In addition to the aspects and advantages described in this summary, further aspects and advantages will become apparent by reference to the drawings and with reference to the detailed description that follows.

Embodiments of the present disclosure disclose methods and a system for labelling parameters related to a paper machine using machine learning models, where the labels comprise normal and abnormal patterns. Further, the present disclosure relates to training machine learning models to predict breaks in the paper machine using the labels. Thereafter, the present disclosure comprises using the machine learning models in real-time to predict breaks in the paper web, analyze root cause for the breaks in the paper web and estimate a time to break. Break notifications are notified to operators to take timely actions.

FIG. 1 illustrates a framework (100) for labelling parameters related to a paper machine (101), predicting a break in a paper web in the paper machine (101), analyzing root cause for the break in the paper web, and estimating time to break in the paper web. Typically, in a paper plant, one or more paper machine (101) is used to manufacture paper.

A paper machine comprises a plurality of sections, and a plurality of sensors are used to monitor the plurality of sections. Historical measurements from the sensors are stored in a historian and are used for analysis such as predicting breaks in the paper web, identifying root cause for historical breaks in the paper web and the like. Typically, parameters related to the paper machine (101) include a plurality of process parameters and a plurality of operating parameters. In an embodiment, the parameters may include, but not limited to, process parameters, drive parameters, raw material parameters, quality control parameters, mechanical parameters, and sensor parameters.

In an embodiment, any parameter in a paper plant can be considered to be envisaged by parameters in the present disclosure. In an embodiment, the plurality of process parameters may include, but not limited to, quality of pulp, pulp to water mixing ratio, wetness factor, and the like. In an embodiment, the plurality of operating parameters may include, but not limited to, speed of drives, paper web drying time, amount of air flow, drive temperature, grade of manufacture, and the like. The present disclosure is not limited to specific parameters of a paper machine and can be modelled to consider a plurality of parameters of the paper machine typically used in a paper plant. The framework (100) comprises a data processing architecture (102) (e.g., Lambda architecture) for providing data collected from the paper machine (101) for labelling normal and abnormal patterns and for predicting the break in the paper web. The data processing architecture (102) is used to process huge quantity of data and provide access to batch processing and stream processing. In the data processing architecture (102) such as Lambda architecture, there exists a batch layer and a stream layer. In an embodiment, a chunk of data (e.g., one hour data, one day data, one week data, one month data) is fed to the batch layer for processing. In an embodiment, a stream of data is fed to the stream layer (also referred as speed layer). Typically, real-time parameters are fed to the stream layer. In the present disclosure, historical parameters related to the paper machine (101) are fed to the batch layer and real-time parameters related to the paper machine (101) are fed to the stream layer. In one embodiment, the batch layer corresponds to off-line analysis of parameters related to the paper machine (101) in the present disclosure and the stream layer corresponds to on-line analysis of the parameters related to the paper machine (101).

In an embodiment, a computing unit (103) such as a personal computer, a laptop, a server, or any other computing device may be used to perform the off-line analysis and the on-line analysis. In an embodiment, the computing unit (103) can be a cloud environment and the computing unit (103) is connected to the paper plant via a network. The computing unit (103) comprises one or more hardware processors and a memory. The off-line analysis is performed by the computing unit (103) to label the parameters related to the paper machine (101) to comprise normal patterns and abnormal patterns. The on-line analysis is performed to predict the break in the paper web using the labelled parameters. Further, the predicted break in the paper web is provided to a notification unit (104) to alert an operator in the paper plant. Also, a root cause for the break, an estimated time to break and one or more actions to be performed to avoid a break in the paper web and notify the one or more actions on the notification unit (104). In an embodiment, the notification unit (104) may include, but are not limited to a display unit, a hooter, a light notification and a combination thereof.

FIG. 2 illustrates a flowchart (200) for labelling the parameters related to the paper machine (101). The method steps of FIG. 2 are described by making reference to FIGS. 3A, 3B, 3B-1, 3B-2, 3C, and FIG. 4. At step (201), the computing unit (103) provides simulated parameters comprising normal and abnormal patterns to a plurality of Machine Learning (ML) models. Now referring to FIG. 3A, as shown under the training stage, the simulated parameters are provided to the plurality of ML models (301a, 301b, ..., 301n). The simulated parameters are simulations of the parameters related to the paper machine (101). Typically, the parameters related to the paper machine comprise a plurality of anomalies. Also, due to huge dataset (generally thousands of parameters for a paper machine), the anomalies which cause the break in the paper web cannot be easily identified. The plurality of anomalies may occur any time during the operation of the paper machine (101).

The present disclosure proposes a robust labelling technique to identify specific anomalies that cause the break in the paper web. The simulated parameters are simulations of the parameters which cause a break in the paper web. Hence, the simulated parameters comprise normal patterns and abnormal patterns of the parameters. A graph of exemplary simulated parameters (variation of magnitude of parameters with respect to time) is shown in the FIGS. 3B, 3B-1, and 3B-2. As shown in these figures, the simulated parameters comprise a plurality of transitions (306a, 306b, 306c, 306d) and a break point (307). The break point (307) indicates the timestamp when the break occurred in the paper web. As seen in the FIG. 3B, after the transitions (306a, 306b and 306c) have occurred, the parameters are normal. Typically, this is the scenario in the paper machine. After several transitions in the parameters, the paper machine operates normally. However, after specific transitions (e.g., 306d) the break occurs in the paper web. By way of observation, the transitions which occur close to the break point (307) are the anomalies and cause for the break in the paper web.

In one embodiment, the simulated parameters are segregated into a plurality of batches. A batch may comprise the plurality of process parameters and the plurality of operating parameters simulated or measured between a time of restarting the paper machine after a break in the paper web, to a time of a subsequent break of the paper web in the paper machine. For example, consider a first break in the paper web occurs in a paper machine at a first timestamp. The paper machine is restored and is operational at a second time stamp, and a second break in the paper web occurs in the paper machine at a third time stamp. A batch may be considered as parameters simulated or measured between the second timestamp and the third timestamp.

Referring back to FIG. 2, at step (202), the computing unit (103) configures the plurality of ML models (301a, . . . , 301n) to label the simulated parameters. In an embodiment, the plurality of ML models (301a, . . . , 301n) may use various labelling techniques to label the simulated parameters. In an embodiment, the plurality of ML models (301a, . . . 301n) are configured to label the abnormal patterns such that the abnormal patterns are proximate to the break point (307). For example, the transition (306d) is close to the break point (307), whereas the transitions (306a, 306b and 306c) are farther away from the break point (307). Hence, a timestamp from where the transition (306d) begins to the timestamp of the break point (307) is labelled as abnormal region comprising the abnormal patterns, and the rest of the region is labelled as normal region comprising the normal patterns. In an embodiment, more proximate the anomalies are to the beak point (305), more accurate is the output of the plurality of ML models (301a, . . . 301n).

Figure 4A:
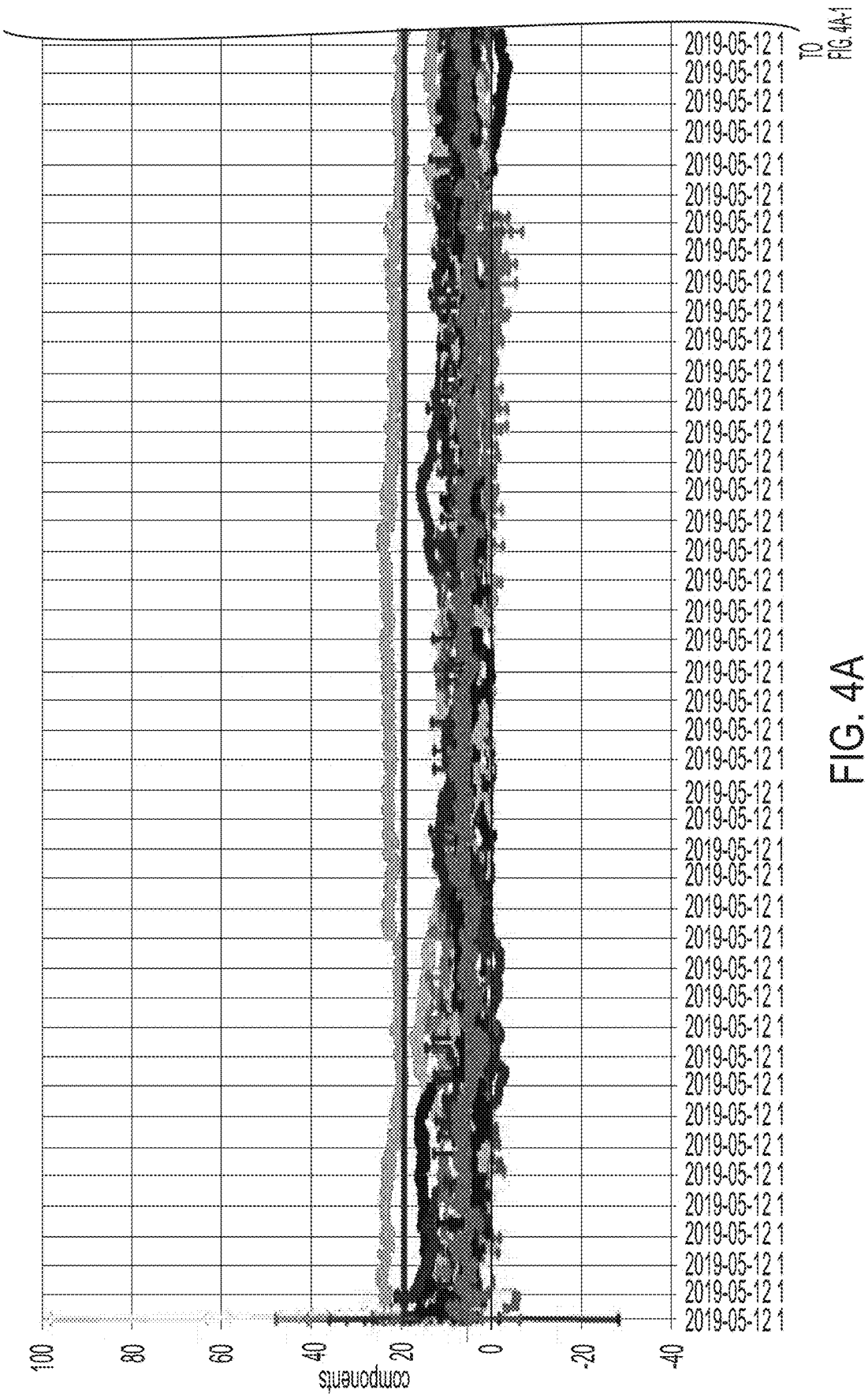

Reference is now made to FIGS. 4A, 4A-1, and 4A-2, which illustrate a graph (variation of magnitude of parameters with respect to time) showing the label abnormal region (401). As seen, the abnormal region (401) is determined from the break point (307). For example, the abnormal region may be the region fifteen minutes prior to the break point (307). In another example, the abnormal region may be the region thirty minutes prior to the break point (307). In another example, the abnormal region may be the region one hour prior to the break point (307). As the plurality of ML models (301a, . . . , 301n) label the normal region and the abnormal region using the break point (307) as reference, the plurality of ML models (301a, . . . , 301n) may be considered to use semi-supervised learning technique. In an embodiment, the normal region and abnormal region is labelled for each batch to predict the break in the paper web. In an embodiment, each parameter (each process parameter and each operating parameter) is labelled to analyze root case for the break in the paper web.

FIGS. 4B and 4B-1 illustrate labelling each parameter with normal region and abnormal region. The label (401) shows the abnormal regions in each parameter. The abnormal regions in each parameter is used to label root cause for the break in the paper web. In an embodiment, a parameter from the plurality of process parameters and the plurality of operating parameters are identified as a root cause for the break in the paper web. In an embodiment, a different parameter may be identified as a root cause by a domain expert based on the abnormal patterns in the parameters. For example, an object falling on the paper web may cause the break in the paper web. A tension sensor may measure tension of the paper web and the tension values may have abnormal patterns due to disturbances caused in the paper web due to the falling object. The domain expert may observe the abnormal patterns in the tension values and identify falling object as a root cause. In another example, a motor speed, which is a measured parameter may have abnormal patterns.

The auto-labeller (304) may identify from the historical batches, that the motor speed having abnormal patterns causes break in the paper web, and label the root cause as the motor speed. From the above two examples, it is evident that, a measured parameter may be a root cause for the break in the paper web or a measured parameter may show abnormal patterns due to an external factor (such as falling object), and the external factor may be the root cause for the break in the paper web.

In an embodiment, the root cause for the break in the paper web is used to label estimated the time to break in the paper web. For example, the auto-labeller (304) may identify from the historical batches that when the motor speed has abnormal patterns, the paper web breaks in 5 minutes from the occurrence of the abnormal patterns. Based on the comparison with the historical batches, the auto-labeller (304) may label an estimated time to break as 5 minutes for an input batch having abnormal motor speed.

Referring again to FIG. 2, at step (203), the computing unit (103) receives an output from each of the plurality of ML models (301a, . . . , 301n). In an embodiment, each ML model outputs a label indicating the normal region and the abnormal region. In an embodiment, each ML model merges the normal region and the abnormal region in the batch. FIG. 3C shows an exemplary graph illustrating merging score plotted against time values by different ML models. A graph may be plotted for each ML model as shown in the FIGS. 4A, 4A-1, and 4A-2. The abnormal region (401) in each graph may vary and may be closer or farther from the break point (307).

At step (204), the computing unit (103) selects a ML model from the plurality of ML models (301a, . . . , 301n) based on the output and one or more performance metrics. Table 1 shows exemplary performance metrics and output of three ML models.

TABLE 1

| Bounds | ML Models | Specificity_merged | Sensitivity_merged | Temporal_score_merged | Sensitivity_specificity_merged |
|---|---|---|---|---|---|
| Loose | 1 | 0.971179 | 0.918404 | −26.129902** | 0.931598 |
| Loose | 2 | 0.956107 | 0.978902 | −42.825000** | 0.973203 |
| Tight | 3 | 0.996217 | 0.819183 | 1.547549** | 0.863442 |

In an embodiment, the performance metric "temporal score merged" indicates the proximity of the abnormal region (401) to the break point (307). A zero value indicates exact prediction whereas with any negative values with increase in magnitude result in predicting normal regions as anomaly and any positive values with increase in magnitude (loose bounds) result in predicting anomalies as normal making the algorithm unreliable for the labeling. For example, If the labelled data is used for one-class learning, then algorithm with negative temporal score near zero or exactly zero (tight bounds) will be selected. Likewise, the performance metric "specificity_merged", "sensitivity_merged" should be maximized. Similarly, many other customized performance metrics are considered to select a ML model from the plurality of ML models (301a, . . . 301n). Thereafter, one or more model parameters (ML technique and its hyperparameters may include for e.g., approximate no of PCA components, distance measure, percentage of neighbors, merging time, raw data, lags data, noise filter window size, scaling criteria, percent of contamination etc.) of the selected ML model is stored in the memory (303) associated with the processor.

Referring back to FIG. 2, at step (205), the computing unit (103) provides the one or more model parameters of the selected ML model and historical parameters related to the paper machine (101) to an auto-labeller (304). In an embodiment, along with the one or more model parameters and the historical parameters, merging time parameter is provided to the auto-labeller (304). The merging time parameter indicates maximum time for which anomalies are merged temporally in a batch. In an embodiment, the merging time parameter is selected based on the performance metrics. In an embodiment, the one or more model hyperparameters and the merging time parameter is fine-tuned for labelling the historical parameters based on the performance metrics. FIG. 3C shows a graph of merging time for the plurality of ML models (301a, . . . , 301n). In an embodiment, the auto-labeller (304) may be a ML model from the plurality of ML models (301a, . . . , 301n). The historical parameters may be obtained from historians (not shown in Figure) associated with the paper plant. The historians may store historical process parameters and operating parameters of the paper machine (101).

In an embodiment, the historical parameters may comprise a plurality of anomalies. Conventional technologies may not efficiently detect the specific anomalies that cause break in the paper web. In the present disclosure, the one or more model parameters are used to label the normal region and abnormal region in the historical parameters. In an embodiment, the historical parameters are provided as plurality of batches. In an embodiment, the auto-labeller labels the entire batch as normal region and abnormal region and also labels each process parameter and each operating parameter with normal and abnormal region. The labelled batches are stored as labelled data in the database (305), and the labelled data is used to predict the break in the paper web. The labels of each process parameter and each operating parameter is used for root cause analysis and estimate of time to predict the break in the paper web.

In an embodiment, each batch of parameters is associated with a grade and each grade comprises specific operating conditions. Examples of grade may include, but are not limited to, bond or writing grade, book grade, text grade. In an embodiment, the grade may be determined based on basis weight of the paper. In an embodiment, independent batches may be analyzed and labelled as normal regions and abnormal regions. For example, the auto-labeller (304) considers Independent batch analysis for a given batch to label normal and abnormal regions. But if the grade and operating conditions of a batch are known then, it is compared with all other batches within the same grade and operating condition to make the labeling more robust. For example, each batch may be associated with a grade and each grade may be associated with one or more operating conditions. For example, while manufacturing a bond paper, the paper machine (101) may be operated at 1500 m/min, whereas, while manufacturing a text grade paper, the paper machine (101) may be operated at 2000 m/min. Likewise, each grade may be associated with different operating conditions and also may include different process conditions. Hence, when a batch associated with a text grade and the paper machine (101) is operated at 2000 m/min, is provided to the auto-labeller (304) for labelling, the auto-labeller (304) may compare the batch with similar historical batches belonging to the text grade and which were operated at 2000 m/min.

Based on the comparison with the similar historical batches, the auto-labeller (304) labels the batch.

Reference is now made to FIG. 5 which illustrates and exemplary graph for selecting parameters contributing to the breaks in the paper web. In an embodiment, each parameter may be numbered, and a graph of each parameter against number of times the break in the paper web occurred due to abnormal patterns in each parameter, is plotted as shown in the FIG. 5. A threshold is set, and one or more parameters crossing the threshold may be selected as most likely parameters causing the break in the paper web. For example, 800 parameters may be recorded when a break occurred in the paper web. However, based on historical analysis, abnormal patterns were identified in first 300 parameters when the break occurred. Hence, only the first 300 parameters may be considered to analyze the root cause for the break in the paper web, and to estimate the time to break in the paper web. Shortlisting the parameters decreases dependence on computational resources.

Figure 6A:
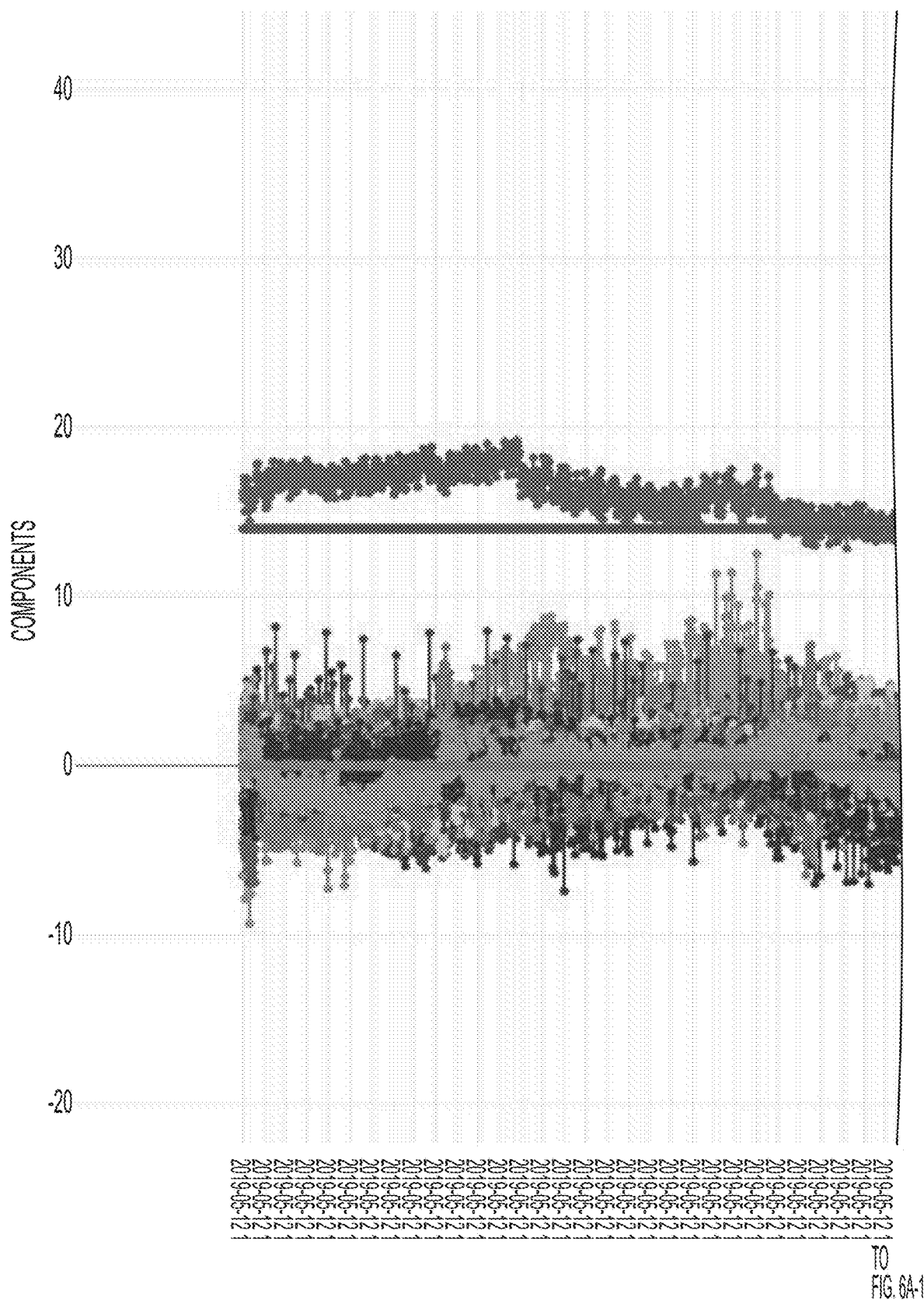
Figures 1, 6A:
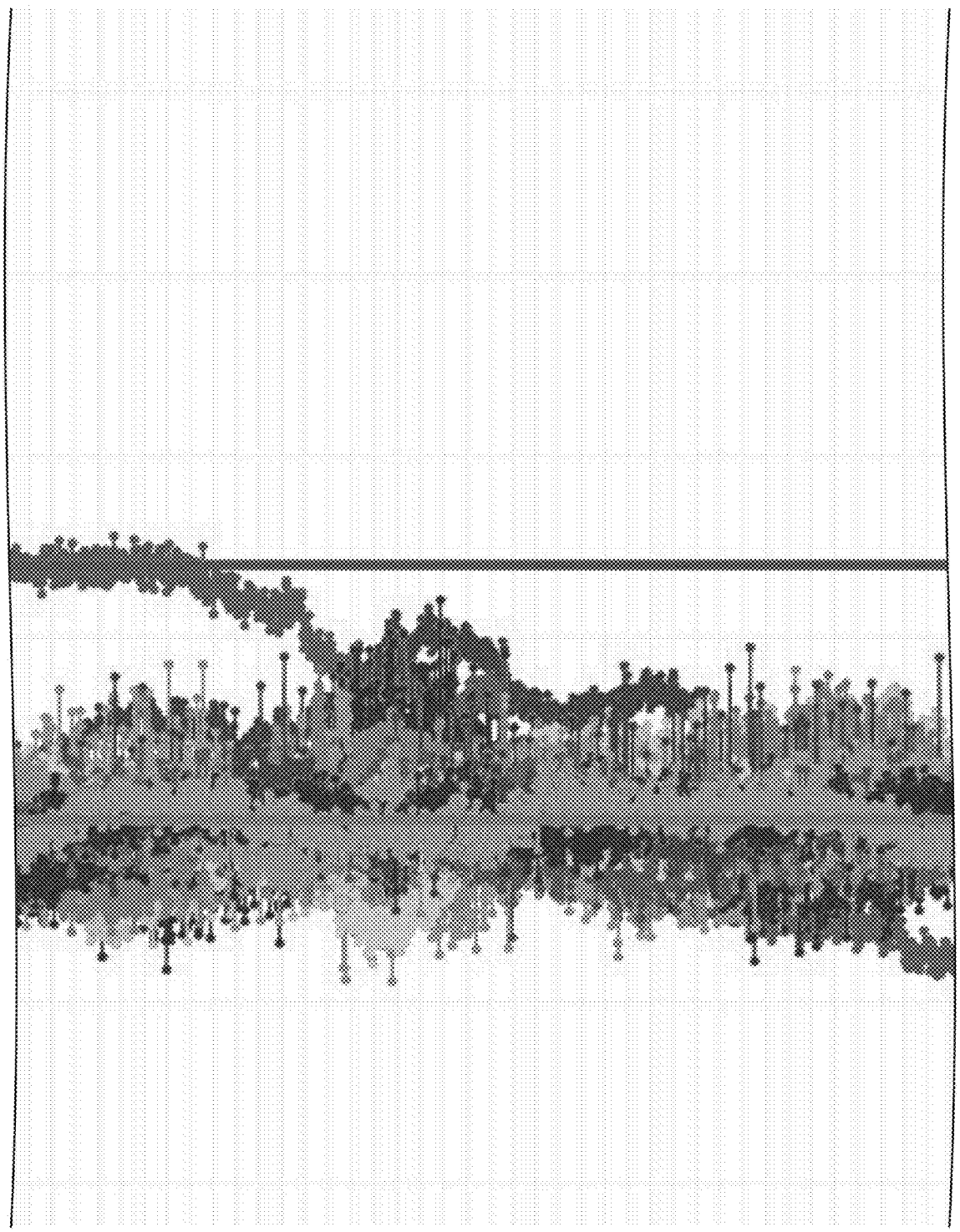
Figures 2, 6A:
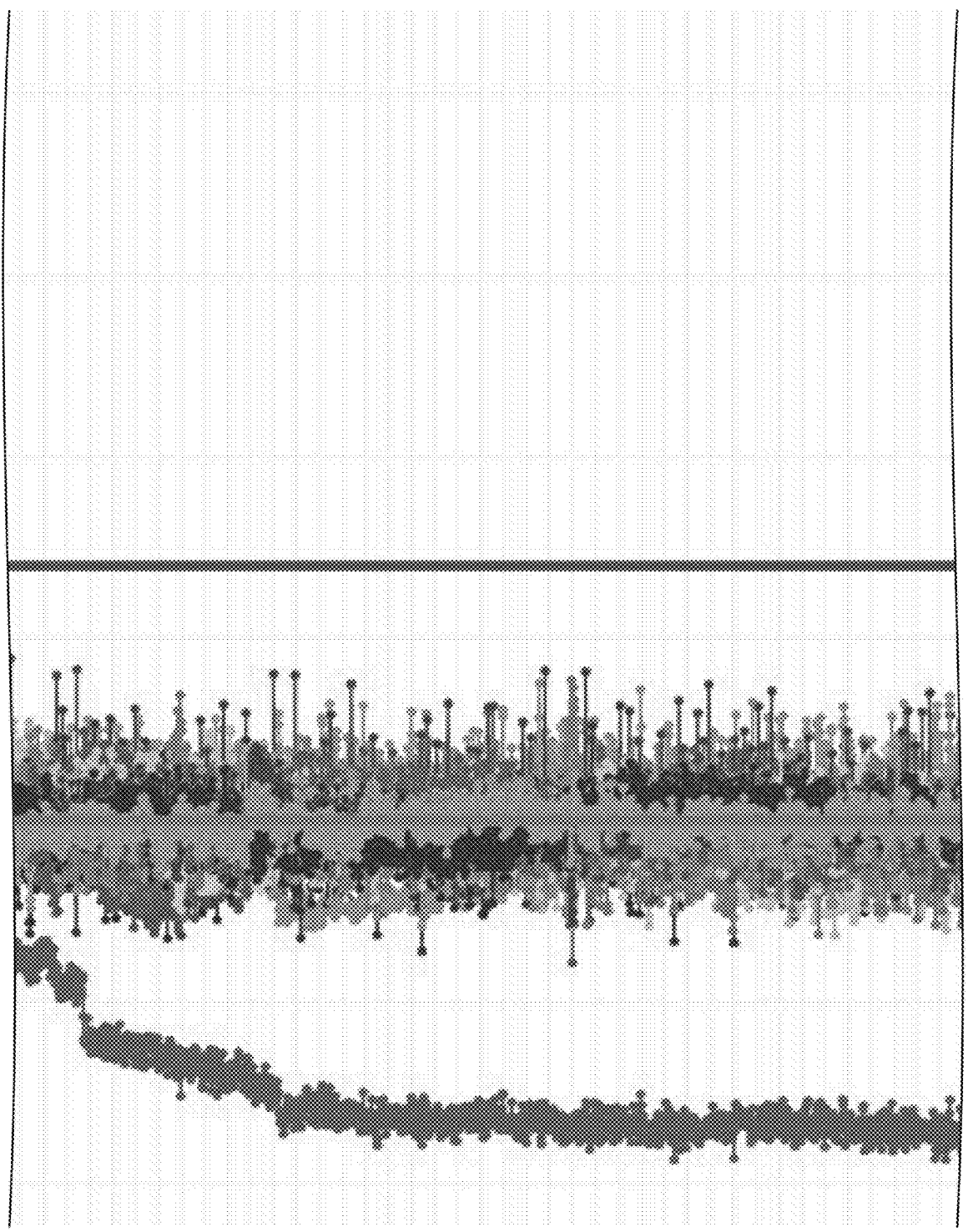
Figures 3, 6A:
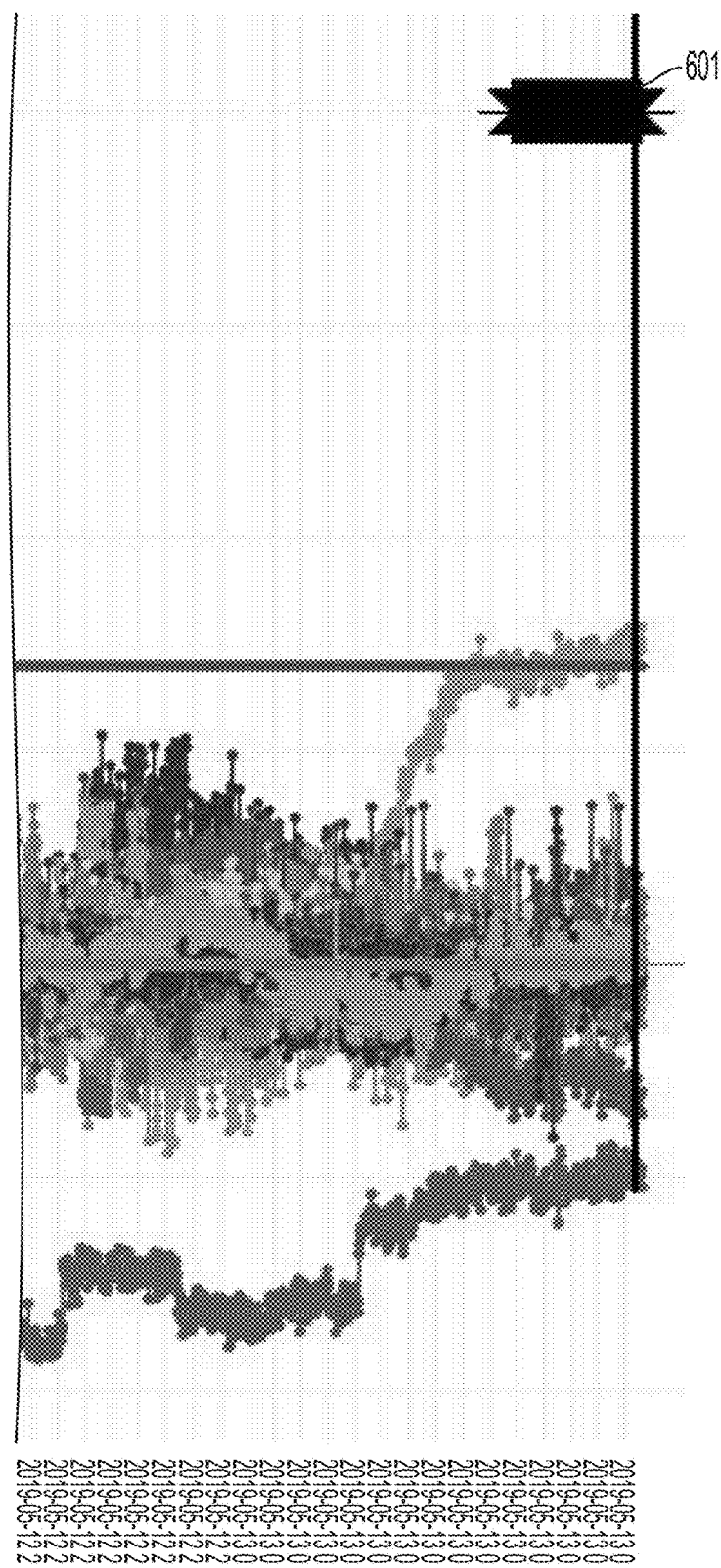
Figure 6B:
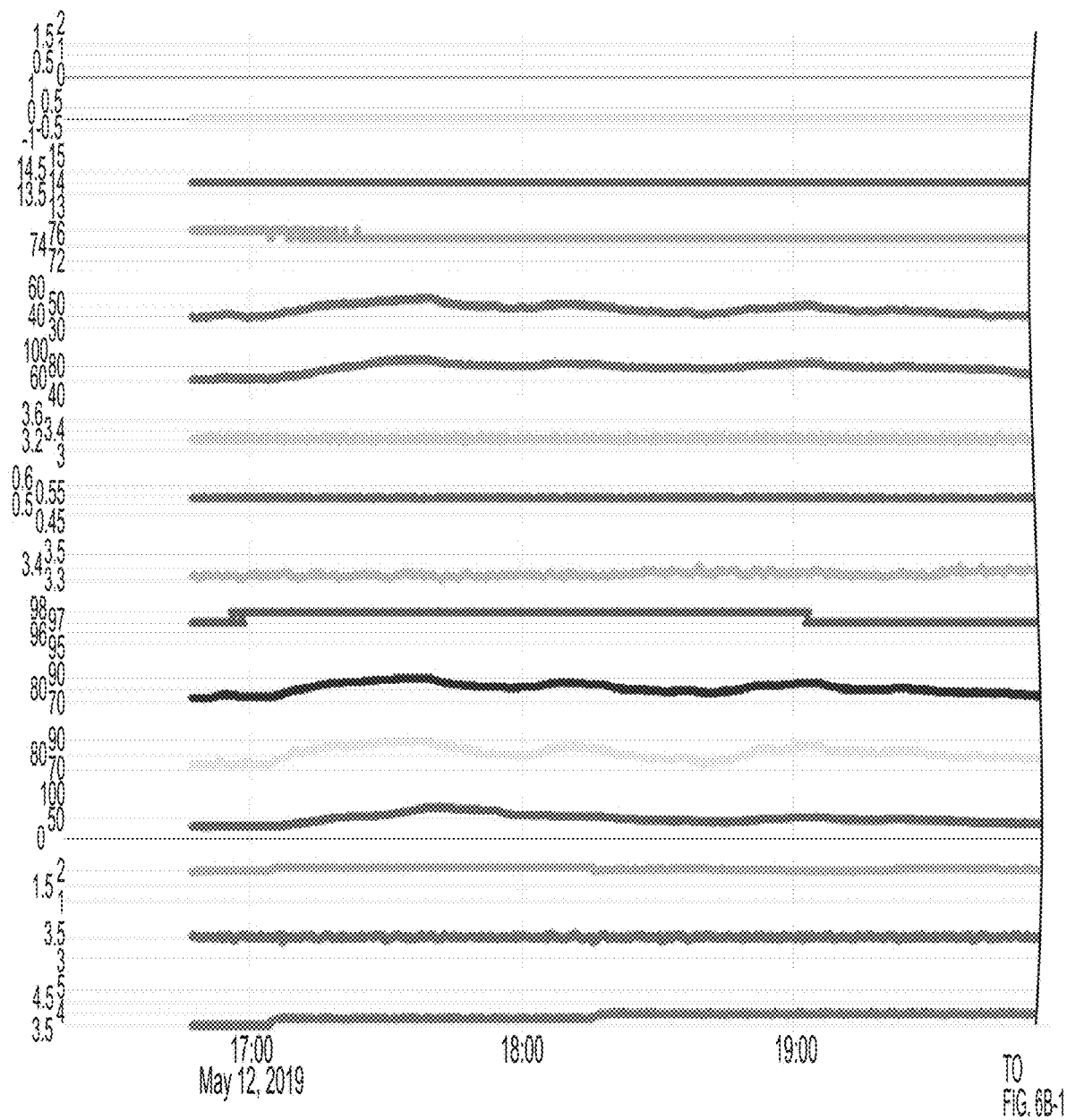
Figures 1, 6B:
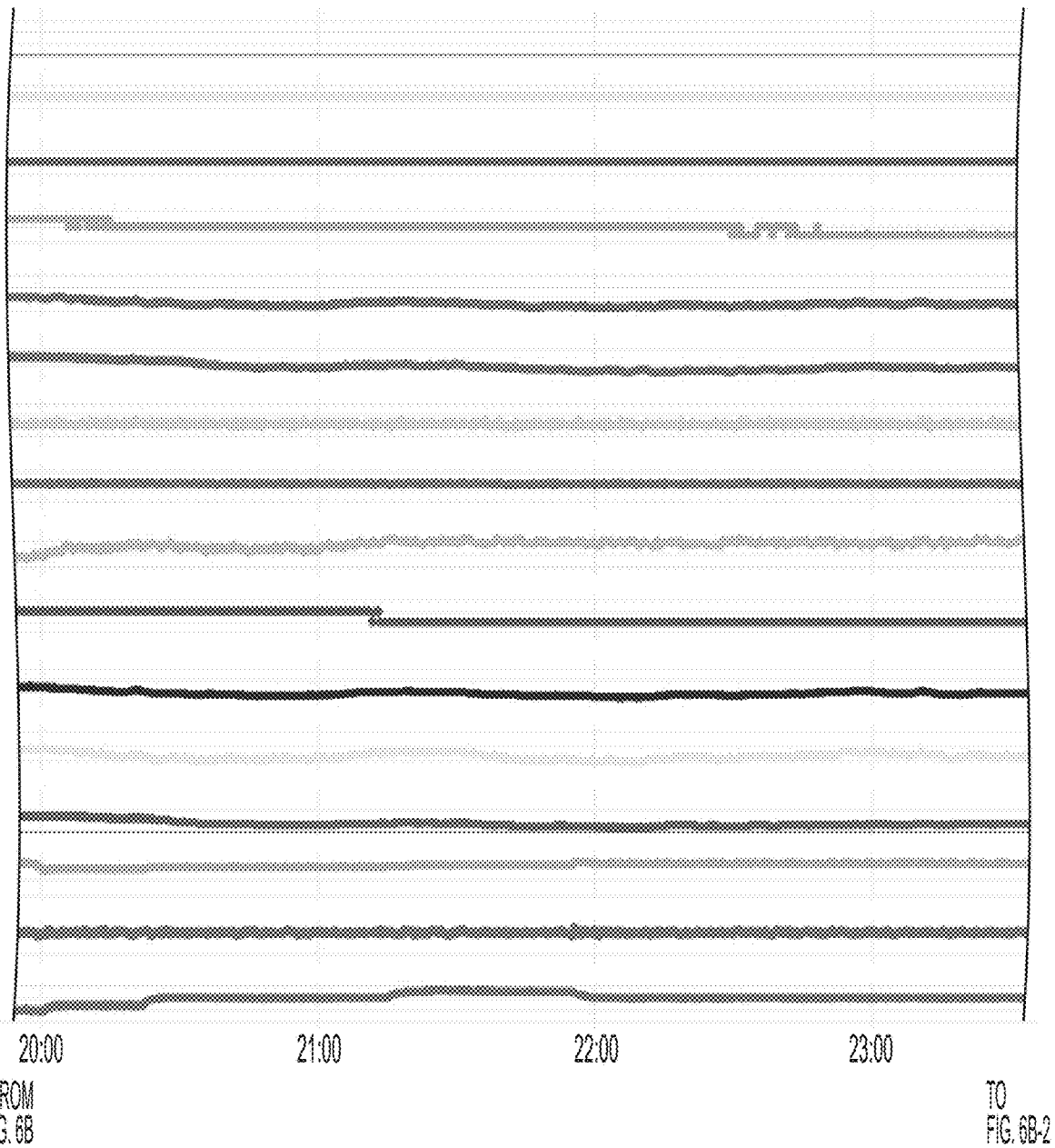
Figures 2, 6B:
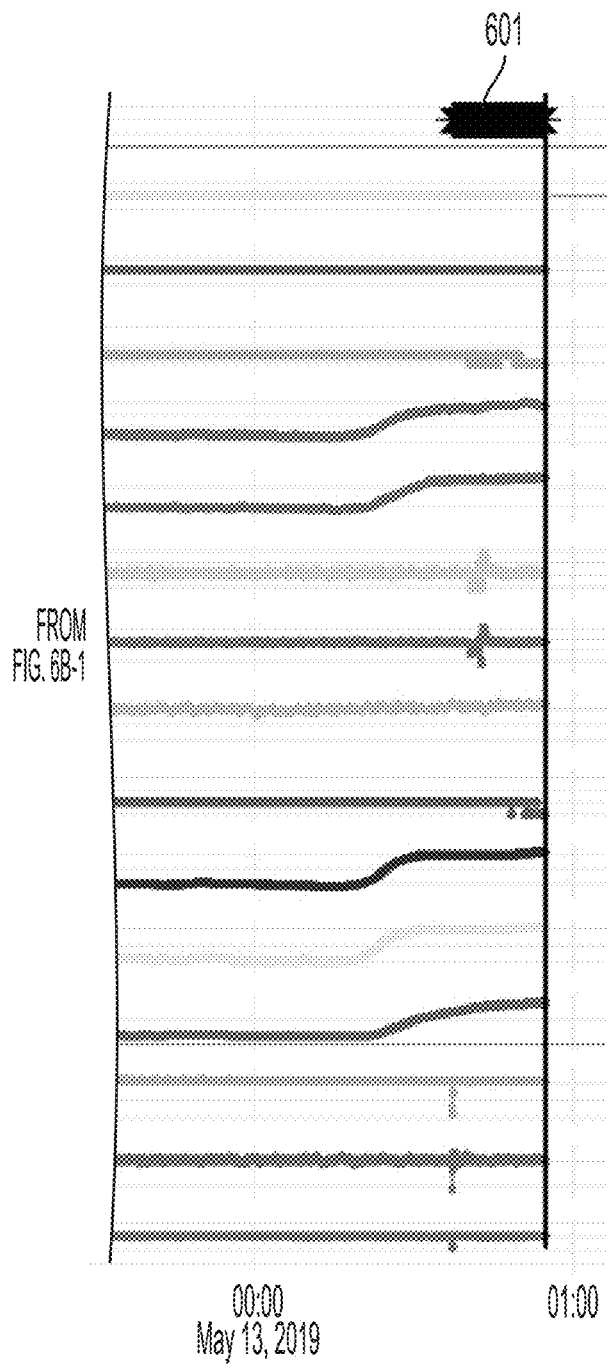

FIGS. 6A, 6A-1, 6A-2, and 6A-3 illustrates a graph of labelling a batch with reduced parameters derived using the graph of FIG. 5, and FIGS. 6B, 6B-1, and 6B-2 illustrate a graph of labelling each parameter in a batch with reduced parameters using the graph of FIG. 6B. the label (601) in the FIG. 6A and FIG. 6B indicates the abnormal patterns in batch having the reduced parameters.

FIG. 7A and FIG. 7B illustrate on-line analysis of the parameters related to the paper machine (101). FIG. 7A and FIG. 7B are described by making reference to FIG. 8A, FIG. 8B and FIG. 9. FIG. 7A illustrates training of a plurality of ML models (801a, . . . 801n) to predict a break in the paper web, predict a root cause for the probable break in the paper web and estimate a time to break in the paper web.

Referring to FIG. 7A, at step (701), the computing unit (103) provides the labelled data to a plurality of ML models (801a, . . . , 801n) (as shown in the FIG. 8A). In an embodiment, the ML models (801a, . . . , 801n) may be different from the plurality ML models (301a, . . . , 301n). The plurality of ML models (801a, . . . , 801n) are configured to predict the break in the paper web, predict a root cause for the probable break in the paper web and estimate a time to break in the paper web. The labelled data comprises the labels for regions in the batches of the historical parameters and labels for each historical parameter, wherein the abnormal regions are proximate to the break point (307).

Referring back to FIG. 7A, at step (702), the computing unit (103) configures the plurality of ML models (801a, . . . , 801n) to detect patterns and determine the detected patterns to be one of, normal patterns and abnormal patterns. The plurality of ML models (801a, . . . , 801n) detects the patterns in the labelled data. The patterns may be the variation of the parameters. For example, a motor speed may be increased from 1000 rpm to 1100 rpm gradually. A pattern in the variation of the speed of the motor is detected. The pattern may be predicted to be one of, normal patterns and abnormal patterns. For example, the variation of the motor speed between 1000 rpm to 1100 rpm may be determined to be normal pattern based on the labels provided in the labelled data. In another example, the increase of the motor speed from 1000 rpm to 1100 rpm abruptly may be determined to be abnormal pattern. In an embodiment, the labels in the labelled data acts as a reference for the plurality of ML models (801a, . . . , 801n) to determine the patterns to be one of, normal patterns and the abnormal patterns. In one embodiment, patterns of parameters having specific states may be determined to be one of normal patterns or abnormal patterns using a classification ML model. In an embodiment, when the parameters do not have specific state (defined classes) and the determination of the parameter is based on values of the parameter, a regression ML model may be used to determine patterns of such parameters to be one of normal patterns or abnormal patterns.

At step (703), the computing unit (103) configures the plurality of ML models (801a, ..., 801n) to generate an expected pattern for each parameter. In an embodiment, the expected pattern indicates reference values for each parameter. In one embodiment, the normal pattern of each parameter is considered as expected pattern. During real-time monitoring of the parameters, when a deviation occurs from the expected patterns of parameters comprising respective normal values, a break is predicted based on the deviation. As many abnormalities in the parameters may not be known to label all the abnormal values, the plurality of ML models (801a, ..., 801n) may be trained to identify the normal values as expected patterns. In an embodiment, training the ML models (801a, ..., 801n) to identify a single class (normal region) is called one-class learning. In an embodiment, the expected pattern comprises normal values and abnormal values. A binary classifier may be used to classify the parameters into normal and abnormal regions. In an embodiment, the binary classifier is used when sufficient abnormal data or anomaly data is used to label the abnormal region.

At step (704), the computing unit (103) receives an output from each of the plurality of ML models (801a, ..., 801n). the output of each of the plurality of ML models (801a, ..., 801n) indicate a prediction of the break in the paper web. Each of the plurality of ML models (801a, ..., 801n) compare the detected pattern with the expected pattern and predict a break in the paper web. For example, when the patterns of parameters in the labelled data do not match with expected pattern, an alert is generated indicating a break in the paper web. In an embodiment, the plurality of ML models (801a, ..., 801n) are further configured to determine a root cause that causes a break in the paper web and estimate a time to break the paper web, based on abnormal patterns in the parameters and the labelled data. Once all the parameters are determined to be in one of the normal pattern and the abnormal pattern, each of the plurality of ML models (801a, ..., 801n) determine the root cause for the break in the paper web. The plurality of ML models (801a, ..., 801n) uses the labelled data to determine the root cause during the training.

Likewise, the plurality of ML models (801a, ..., 801n) uses the labelled data to estimate the time to break for the paper web during training. During training, as the labelled data comprising labels for the historical parameters (which is generally a huge dataset), the plurality of ML models (801a, ..., 801n) may generate an association between the parameters having the abnormal patterns and the determined root cause. Likewise, the plurality of ML models (801a, ..., 801n) may generate an association between the parameters having the abnormal patterns and the estimated time to break the paper web. For example, when an object falls on the paper web, the tension values of the paper web comprise abnormal patterns. During training, when sufficient tension values having abnormal patterns are provided when an object had fallen on the paper web, the plurality of ML models (801a, ..., 801n) may identify the abnormal pattern of the tension parameter and associate that when such an abnormal pattern is identified, the root cause is an object falling on the paper web. Considering the above example, when the tension parameter has abnormal patterns, the break point is 3 minutes from occurrence of such abnormal pattern. During training, when sufficient tension values having at least one of normal and abnormal patterns are provided, the plurality of ML models (801a, ..., 801n) may identify the normal or abnormal patterns in the tension parameter and estimate that the paper web will break in 3 minutes.

At step (705), the computing unit (103) selects a ML model (e.g., 801a) from the plurality of ML models (801a, ..., 801n) based on the output of the plurality of ML models (801a, ..., 801n). In an embodiment, a model selector (802) which may be a module implemented by the processor of the computing unit (103) may select the ML model (e.g., 801a) based on performance of the plurality of ML models (801a, ..., 801n). For example, the ML model (801a) is selected when the ML model (801a) satisfies one or more performance metrics related to the plurality of ML models (801a, ..., 801n). Thereafter, the model selector (802) stores the selected model (e.g., 801a) in the memory (303). When the plurality of ML models (801a, ..., 801n) are supervised models, then confusion matrix based metrics (e.g., accuracy, precision, recall, auc-roc, f1 score, etc.). If the models are semi-supervised (one-class learning) then mean square error (MSE), $R^2$ etc., can be used. For example, if encoder decoder mechanism is used, then MSE can be used as performance metric.

In an embodiment, the training of the plurality of ML models (801a, ..., 801n) may be performed using supervised or semi-supervised techniques. In an embodiment, when the labelled data comprises labels according to grades and the operating conditions, supervised techniques may be used and when the labelled data comprises labels according to independent batches, semi-supervised techniques or one-class learning may be used.

Reference is now made to FIG. 7B which illustrates the inference made by the selected ML model (e.g., 801a) in real-time. At step (706), the computing unit (103) receives the parameters related to the paper machine (101) from the plurality of sensors in real-time. In an embodiment, the computing unit (103) may receive the parameters via the data processing architecture (102). The data processing architecture (102) streams the real-time parameters to the computing unit (103), where the parameters received are time-series data. The data processing architecture (102) may pre-process the parameters to reduce noise, increase strength of the parameters, and the like.

At step (707), the computing unit (103) determines a pattern in variation of each parameter with time. In an embodiment, the computing unit (103) may sample the parameters at a high rate to determine minute variations in the parameters.

At step (708), the computing unit (103) compares the determined pattern with an expected pattern. The computing unit (103) may implement the selected ML model (e.g., 801a) to compare the determined pattern with the expected pattern. In an embodiment, the expected pattern may comprise the normal pattern. In an embodiment, the expected pattern may comprise the normal pattern and the abnormal patterns. For example, when the received parameter is motor speed, the expected pattern may comprise abnormal variation of motor speed the selected ML model (e.g., 801a) determines the motor parameter to comprise abnormal patterns.

At step (709), the computing unit (103) predicts the break in the paper web based on the comparison. The selected ML model (e.g., 801a) predicts the break in the paper web when the determined pattern does not match with the expected pattern, when the expected pattern comprises normal values.

The selected ML model (e.g., 801*a*) predicts the break in the paper web when the determined pattern matches the expected pattern, when the expected pattern comprises abnormal values. In an embodiment, the selected ML model (801*a*) provides the predicted results on the notification unit (104). Also, the selected ML model (e.g., 801*a*) determines a root cause for the break in the paper web based on the association between the abnormal patterns in the parameters and the root cause for the break in the paper web. Likewise, the selected ML model (e.g., 801*a*) estimates a time to break in the paper web based on the association between the abnormal patterns in the parameters and the estimated time to break in the paper web.

In an embodiment, in the predicted break in the paper web for a labelled parameters, the label (601) is generated by the auto-labeller (304) and the label (901) is predicted using the selected ML model (e.g., 801*a*).

In an embodiment, the computing unit (103) receives the parameters after each break in the paper web. In few scenarios, the break in the paper web may not be predicted, or corrective actions may not be taken in time to prevent the break from happening. In such cases, post-mortem analysis is performed. In the post-mortem analysis, the computing unit (103) receives the parameters after the break has occurred in the paper web. Further, the computing unit provides the parameters to the auto-labeller (304) for generating labels comprising the normal patterns and abnormal patterns. In an embodiment, the auto-labeller may generate new labels comprising the normal patterns and the abnormal patterns. In an embodiment, a parameter may belong to new behavior like new grade or operating conditions due to which the selected ML model (801*a*) could not have predicted the break in the paper web. Such new variations or patterns of parameters are labelled and stored in the database (305).

In an embodiment, the computing unit (103) enables the selected ML model (e.g., 801*a*) to adaptively learn based on the new or updated labels stored in the database (305). Reference is now made to FIG. 8B. The computing unit (103) provides the labelled data stored in the database (305) to the selected ML model (e.g., 801*a*). Further, the computing unit (103) identifies one or more new patterns from the labelled data that caused the break in the paper web and updates the selected ML model (e.g., 801*a*) to adapt to the one or more new patterns and configure the selected ML model (e.g., 801*a*) to predict the break in the paper web based on the one or more new patterns. In an embodiment, the selected ML model (e.g., 801*a*) may be updated at regular time intervals (e.g., every week, or every month, once in six months).

In an embodiment, the computing unit (103) performs prescriptive analysis on the plurality of process parameters and the plurality of operating parameters and the at least one parameter identified as the root cause for the break in the paper web, to determine one or more actions to be performed to avoid break in the paper web. In an embodiment, the selected ML model (801*a*) or a different ML model may be trained based on the root causes to provide one or more actions to be performed when a break occurs in the paper web. For example, during training of the ML model, when a motor speed parameter is identified as root cause for a break, the domain expert may have performed actions like switching off the paper machine and scheduling a maintenance activity for the motor. In real-time, when the break has occurred due to abnormalities in the motor speed, the ML model prescribes to schedule the maintenance activity for the motor causing the break.

Reference is now made to FIG. 9 which illustrates the prediction of breaks in on-line analysis in the paper web using a single model, multi-loss Attention based Bidirectional Long Short-Term Memory (LSTM) encoder decoder model for paper web break prediction as well as root causes. The graph shown in the FIG. 10 is for lag data. In an embodiment, data processed using any feature engineering techniques may be provided to the selected ML model (e.g., 801*a*). For example, lags or first difference, second difference of raw values, various transforms or any feature engineering methods can be used for the ML models (e.g., 301*a* or 801*a*).

FIG. 10 shows a graph illustrating reconstruction error. In an embodiment, the reconstruction error indicates the deviation of the determined pattern from the expected pattern. As shown in the FIG. 10, the star mark indicates the labelled anomaly region (reconstruction error) generated by the auto-labeller (304). Reconstruction error on abnormal region is higher than normal region.

FIG. 11 shows the learning curve of multi-loss LSTM encoder-decoder model with attention mechanism based on mean square error over. As shown in FIG. 11, the loss value of the training and the testing has decreased, then started overfitting. FIGS. 12A and 12B shows a Deep Learning architecture diagram for the training plot as shown in FIG. 11.

In an embodiment, the computing unit (103) transfers knowledge of the selected ML model (801*a*) to a new ML model for predicting a break in a paper web, determining a root cause for break in the paper web, and estimating a time to break of the paper web in a new paper machine. For example, the paper plant may comprise two or more paper machines. The selected ML model (801*a*) is implemented for a first paper machine. Instead of implementing a new ML model (e.g., 801*b*) for the second machine, ML model (e.g., 801*a*) can be transferred to the ML model (801*b*). Further, the ML model (801*b*) may be trained with limited dataset according to parameters provided to the second paper machine. In an embodiment, transfer learning can be performed between paper plants as well. FIG. 13 shows an exemplary block diagram for transferring knowledge from one ML model (trained model) associated with a first paper machine to another ML model (untrained model) associated with a second paper machine.

In an embodiment, the present disclosure provides framework to label the abnormal regions robustly and predict the breaks in the paper web efficiently. The present disclosure reduces false positives while predicting the breaks in the paper web as the normal regions and abnormal regions are labelled accurately, and only the deviations causing the breaks are detected. The present disclosure reduces manual requirement to label dataset, while providing accuracy in generating the labels. ML models are retrained frequently to incorporate new variations in parameters and new parameters. In an embodiment, the present disclosure automates feasibility study for predicting break in the paper webs and for determining root causes for the breaks in the paper webs. In an embodiment, the present disclosure automates the process of labelling regions of batches for predicting breaks in the paper web and labelling each parameter for predicting root cause for the breaks. In an embodiment, the present disclosure may implement ensemble ML techniques to label the regions, label the parameters, predict the breaks, and predict the root causes for the breaks.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERENCE NUMERALS

100— framework
101—paper machine
102—data processing architecture
103—computing unit
104—notification unit
301a-301n— ML models (off-line analysis)
302— model selector (off-line analysis)
303— memory
304—auto-labeller
305— database
306a-306d— anomalies
307—break point
401—abnormal label
601—abnormal label (reduced dataset)
801a-801n— ML models (on-line analysis)
802— model selector (on-line analysis)
901— predicted label All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of labelling parameters related to a paper machine to predict a break in paper web in the paper machine, wherein the parameters comprise a plurality of process parameters and a plurality of operational parameters, wherein the method is performed by a computing unit, the method comprising:

providing simulated parameters related to the paper to a plurality of machine learning models, the simulated parameters comprising normal patterns and abnormal patterns, the simulated parameters being known to have caused a break in the paper web;

configuring the plurality of machine learning models to label the simulated parameters into normal patterns and abnormal patterns, wherein the abnormal patterns are proximate to a timestamp of the break in the paper web;

receiving an output from each of the plurality of machine learning models, wherein the output is indicative of labels comprising the normal patterns and the abnormal patterns;

selecting a machine learning model from the plurality of machine learning models based on one or more performance metrics and the output of the plurality of machine learning models, and storing one or more model parameters of the selected model in a memory of the computing unit;

providing a plurality of details of the selected model to an auto-labeller independent of the machine learning model and labelling, by the auto-labelller, the historical parameters into the same normal patterns and the same abnormal patterns, the historical parameters comprising at least one of the normal patterns and the abnormal patterns, wherein the labels generated by the auto-labeller are stored as labelled data in a database;

using the labelled data for predicting a break in the paper web in real-time; and performing one or more actions to the paper machine to control the paper machine to avoid the predicted break in the paper web.

2. The method as claimed in claim 1, wherein the simulated parameters and the historical parameters are received in a plurality of batches, wherein each batch comprises the plurality of process parameters and the plurality of operating parameters simulated or measured between a time of restarting the paper machine after a break in the paper web, to a time of a subsequent break of the paper web in the paper machine.

3. The method as claimed in claim 2, wherein each batch of the plurality of batches is labelled to comprise the normal patterns and the abnormal patterns based on providing similar batches to the auto-labeller, wherein the similar batches share at least one aspect with a provided batch of the plurality of batches.

4. The method as claimed in claim 1, further comprising labelling the simulated parameters and the historical parameters having the abnormal patterns with a root cause for the break in the paper web, wherein the root cause for the break in the paper web is included in the labelled data.

5. The method as claimed in claim 1, further comprising labelling the stimulated parameters and the historical parameters having the abnormal patterns with an estimated time to break the paper web, wherein the estimated time to break the paper web is included in the labelled data.

6. The method as claimed in claim 1, wherein each batch is labelled to comprise the normal patterns and the abnormal patterns based on independently analyzing each batch.

7. The method as claimed in claim 1, wherein the auto-labeller independent of the machine learning model is a separate, second machine learning model from the plurality of machine learning models.

8. The method as claimed in claim 1, wherein the simulated parameters are associated with a defined time interval between a first break in the paper web and a second break in the paper web.

9. The method as claimed in claim 1, further comprising:
receiving the parameters after each break in the paper web;
providing the parameters to an auto-labeller for generating labels comprising the same normal patterns and the same abnormal patterns;
storing the generated labels as labelled data in a database;
providing the labelled data stored in the database to the selected machine learning model as a feedback at defined intervals of time;
identifying one or more new patterns from the labelled data that caused the break in the paper web; and
updating the selected machine learning model to adapt to the one or more new patterns and configure the selected machine learning model to predict the break in the paper web based on the one or more new patterns.

10. The method as claimed in claim 1, further comprising:
transferring knowledge of the selected machine learning model to a new machine learning model for predicting a break in a paper web of a second paper machine; and
using the new machine learning model to predict the break in the paper web of the second paper machine in real-time.

11. A method of predicting a break in a paper web in a paper machine, wherein a plurality of sensors are used to monitor parameters related to the paper machine, wherein the parameters comprise a plurality of process parameters and a plurality of operating parameters, wherein a paper web is formed in the paper machine during manufacturing of paper, wherein the method is performed by a computing unit, the method comprising:
receiving the parameters from the plurality of sensors;
determining a pattern in a variation of each parameter, with respect to time;
comparing the determined pattern with a corresponding expected pattern; and
predicting a break in the paper web based on the comparison;
wherein the corresponding expected pattern is generated using a selected trained machine learning model from a plurality of machine learning models,
wherein training of the plurality of machine learning models comprises:
providing labelled data comprising normal patterns and abnormal patterns of the parameters, to the plurality of machine learning models,
wherein a timestamp associated with the abnormal values is proximate to a timestamp of the break in the paper web,
wherein the labelled data is generated using an auto-labeller independent of the plurality of machine learning models using simulated parameters and historical parameters related to the paper machine to label the historical parameters into the same normal patterns and the same abnormal patterns;
configuring the plurality of machine learning models to detect patterns in the parameters and determine the detected patterns into at least one of normal patterns and abnormal patterns;
configuring the plurality of machine learning models to generate the expected pattern for each parameter based on the determined patterns, wherein each expected pattern comprises at least one of, normal pattern and abnormal pattern;
receiving an output from each of the plurality of machine learning models, wherein the output is indicative of a prediction of a break in the paper web based on a comparison of the labelled data with corresponding expected patterns;
selecting a machine learning model from the plurality of machine learning models, based on the output of the plurality machine learning models, as the selected trained machine learning model; and
performing one or more actions to the paper machine to control the paper machine to avoid the predicted break in the paper web.

12. The method as claimed in claim 11, wherein each of the plurality of machine learning models is further trained to:
estimate a time to break the paper web and determine a root cause that causes a break in the paper web based on abnormal patterns in the parameters and the labelled data; and
generate an association between the abnormal patterns and the estimation of time to break of the paper web, and an association between the abnormal patterns and the root cause for the break in the paper web.

13. The method as claimed in claim 11, wherein the selected model is further configured to:
identify the abnormal patterns in the parameters received from the one or more sensors based on the comparison of each of the determined pattern with corresponding expected pattern; and
determine a root cause for the break in the paper web and an estimate of time to break in the paper web based on an association between the abnormal patterns and the root cause for the break in the paper web and an association between the abnormal patterns and the estimation of time to break of the paper web.

14. The method as claimed in claim 11, further comprising:
receiving the parameters after each break in the paper web;
providing the parameters to an auto-labeller for generating labels comprising the same normal patterns and the same abnormal patterns; and
storing the generated labels as labelled data in a database.

15. The method as claimed in claim 14, further comprising:
providing the labelled data stored in the database to the selected machine learning model as a feedback at defined intervals of time;
identifying one or more features from the labelled data that caused the break in the paper web; and
updating the selected machine learning model to adapt to one or more new patterns and configure the selected machine learning model to predict the break in the paper web based on the one or more new patterns.

16. The method as claimed in claim 11, further comprising performing prescriptive analysis on the plurality of process parameters and the plurality of operating parameters and the at least one parameter identified as the root cause for the break in the paper web, and determining one or more actions to be performed to avoid the break in the paper web.

17. The method as claimed in claim 11, further comprising transferring one or more model parameters of the machine learning model to a new machine learning model for predicting a break in a paper web, determining a root cause for break in the paper web, and estimating a time to break of the paper web in a new paper machine.

\* \* \* \* \*